(12) United States Patent
Satzoda et al.

(10) Patent No.: US 11,392,131 B2
(45) Date of Patent: Jul. 19, 2022

(54) METHOD FOR DETERMINING DRIVING POLICY

(71) Applicant: Nauto, Inc., Palo Alto, CA (US)

(72) Inventors: Ravi Kumar Satzoda, Palo Alto, CA (US); Suchitra Sathyanarayana, Palo Alto, CA (US); Ludmila Levkova, Palo Alto, CA (US); Stefan Heck, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 389 days.

(21) Appl. No.: 16/287,937

(22) Filed: Feb. 27, 2019

(65) Prior Publication Data

US 2019/0265712 A1  Aug. 29, 2019

Related U.S. Application Data

(60) Provisional application No. 62/729,350, filed on Sep. 10, 2018, provisional application No. 62/635,701, filed on Feb. 27, 2018.

(51) Int. Cl.
  *G05D 1/02* (2020.01)
  *B60W 40/09* (2012.01)
(52) U.S. Cl.
  CPC ........... *G05D 1/0221* (2013.01); *B60W 40/09* (2013.01); *G05D 1/0246* (2013.01); *G05D 2201/0213* (2013.01)
(58) Field of Classification Search
  None
  See application file for complete search history.

(56) References Cited

U.S. PATENT DOCUMENTS

| | | |
|---|---|---|
| 5,584,035 A | 12/1996 | Duggan et al. |
| 5,638,116 A | 6/1997 | Shimoura et al. |
| 5,642,106 A | 6/1997 | Hancock et al. |
| 5,798,949 A | 8/1998 | Kaub |
| 5,898,390 A | 4/1999 | Oshizawa et al. |
| 5,961,571 A | 10/1999 | Gorr et al. |
| 6,018,728 A | 1/2000 | Spence et al. |
| 6,240,367 B1 | 5/2001 | Lin |
| 6,480,784 B2 | 11/2002 | Mizuno |
| 6,496,117 B2 | 12/2002 | Gutta et al. |
| 6,502,033 B1 | 12/2002 | Phuyal |

(Continued)

FOREIGN PATENT DOCUMENTS

| | | |
|---|---|---|
| DE | 102009005730 A1 | 7/2010 |
| EP | 3057061 B1 | 8/2017 |

(Continued)

OTHER PUBLICATIONS

Marco et al., "Eye Gaze Behavior Under Chromatic Impairments and Quality Assessment," 2015, Publisher: IEEE.*

(Continued)

*Primary Examiner* — Tuan C To
(74) *Attorney, Agent, or Firm* — Vista IP Law Group, LLP

(57) ABSTRACT

Systems and methods for driving. A driving data set for each of plurality of human-driven vehicles is determined. For each driving data set, exterior scene features of an exterior scene of the respective vehicle are extracted from the exterior image data. A driving response model is trained based on the exterior scene features and the vehicle control inputs from the selected driving data sets.

20 Claims, 8 Drawing Sheets

(56) References Cited

U.S. PATENT DOCUMENTS

| | | | |
|---|---|---|---|
| 6,552,141 B1 | 4/2003 | Chmelir | |
| 6,662,141 B2 | 12/2003 | Kaub | |
| 6,720,920 B2 | 4/2004 | Breed et al. | |
| 6,927,694 B1 | 8/2005 | Smith et al. | |
| 7,085,637 B2 | 8/2006 | Breed et al. | |
| 7,148,913 B2 | 12/2006 | Keaton et al. | |
| 7,177,737 B2 | 2/2007 | Karlsson et al. | |
| 7,195,394 B2 | 3/2007 | Singh | |
| 7,212,651 B2 | 5/2007 | Viola et al. | |
| 7,421,321 B2 | 9/2008 | Breed et al. | |
| 7,423,540 B2 | 9/2008 | Kisacanin | |
| 7,460,940 B2 | 12/2008 | Larsson et al. | |
| 7,471,929 B2 | 12/2008 | Fujioka et al. | |
| 7,502,677 B2 | 3/2009 | Weichenberger et al. | |
| 7,502,688 B2 | 3/2009 | Hirokawa | |
| 7,551,093 B2 | 6/2009 | Maass | |
| 7,558,672 B2 | 7/2009 | Egami et al. | |
| 7,639,148 B2 | 12/2009 | Victor | |
| 7,646,922 B2 | 1/2010 | Au et al. | |
| 7,844,077 B2 | 11/2010 | Kochi et al. | |
| 7,853,072 B2 | 12/2010 | Han et al. | |
| 7,868,821 B2 | 1/2011 | Hoshizaki | |
| 7,912,288 B2 | 3/2011 | Winn et al. | |
| 7,954,587 B2 | 6/2011 | Kisanuki et al. | |
| 7,974,748 B2 | 7/2011 | Goerick et al. | |
| 8,022,831 B1 | 9/2011 | Wood-Eyre | |
| 8,073,287 B1 | 12/2011 | Wechsler et al. | |
| 8,114,568 B2 | 2/2012 | Van et al. | |
| 8,144,542 B2 | 3/2012 | Na | |
| 8,174,568 B2 | 5/2012 | Samarasekera et al. | |
| 8,195,394 B1 | 6/2012 | Zhu et al. | |
| 8,254,670 B2 | 8/2012 | Prokhorov | |
| 8,266,132 B2 | 9/2012 | Ofek et al. | |
| 8,301,344 B2 | 10/2012 | Simon et al. | |
| 8,344,849 B2 | 1/2013 | Larsson et al. | |
| 8,369,608 B2 | 2/2013 | Gunaratne | |
| 8,441,519 B2 | 5/2013 | Oshima et al. | |
| 8,442,791 B2 | 5/2013 | Staehlin | |
| 8,447,519 B2 | 5/2013 | Basnayake et al. | |
| 8,487,775 B2 | 7/2013 | Victor et al. | |
| 8,498,813 B2 | 7/2013 | Oohashi et al. | |
| 8,502,860 B2 | 8/2013 | Demirdjian | |
| 8,510,196 B1 | 8/2013 | Brandmaier et al. | |
| 8,594,920 B2 | 11/2013 | Shida | |
| 8,606,492 B1 | 12/2013 | Botnen | |
| 8,619,135 B2 | 12/2013 | Shellshear et al. | |
| 8,654,151 B2 | 2/2014 | Kim | |
| 8,666,644 B2 | 3/2014 | Goto | |
| 8,676,498 B2 | 3/2014 | Ma et al. | |
| 8,744,642 B2 | 6/2014 | Nemat-Nasser et al. | |
| 8,761,439 B1 | 6/2014 | Kumar et al. | |
| 8,799,034 B1 | 8/2014 | Brandmaier et al. | |
| 8,805,707 B2 | 8/2014 | Schumann et al. | |
| 8,854,199 B2 | 10/2014 | Cook et al. | |
| 8,862,380 B2 | 10/2014 | Jung | |
| 8,934,709 B2 | 1/2015 | Saptharishi et al. | |
| 8,952,819 B2 | 2/2015 | Nemat-Nasser | |
| 9,019,571 B2 | 4/2015 | Yamada | |
| 9,053,554 B2 | 6/2015 | Uchida et al. | |
| 9,079,571 B2 | 7/2015 | Trost et al. | |
| 9,081,650 B1 | 7/2015 | Brinkmann et al. | |
| 9,111,147 B2 | 8/2015 | Thornton et al. | |
| 9,121,713 B2 | 9/2015 | Samarasekera et al. | |
| 9,146,558 B2 | 9/2015 | Field et al. | |
| 9,158,962 B1 | 10/2015 | Nemat-Nasser et al. | |
| 9,180,887 B2 | 11/2015 | Nemat-Nasser et al. | |
| 9,201,424 B1 | 12/2015 | Ogale | |
| 9,201,932 B2 | 12/2015 | Silver et al. | |
| 9,218,003 B2 | 12/2015 | Fong et al. | |
| 9,235,750 B1 | 1/2016 | Sutton et al. | |
| 9,305,214 B1 | 4/2016 | Young et al. | |
| 9,327,743 B2 | 5/2016 | Green et al. | |
| 9,330,571 B2 | 5/2016 | Ferguson et al. | |
| 9,349,113 B2 | 5/2016 | Bashkin | |
| 9,358,976 B2 | 6/2016 | Stierlin | |
| 9,412,102 B2 | 8/2016 | Wolf et al. | |
| 9,429,439 B2 | 8/2016 | Stümper | |
| 9,439,036 B2 | 9/2016 | Spears et al. | |
| 9,443,309 B2 | 9/2016 | Menashe et al. | |
| 9,465,978 B2 | 10/2016 | Hachisuka et al. | |
| 9,472,102 B2 | 10/2016 | McClain et al. | |
| 9,491,374 B1 | 11/2016 | Avrahami et al. | |
| 9,514,626 B2 | 12/2016 | Wu et al. | |
| 9,535,878 B1 | 1/2017 | Brinkmann et al. | |
| 9,573,541 B2 | 2/2017 | Graumann et al. | |
| 9,679,480 B2 | 6/2017 | Hakeem | |
| 9,688,150 B2 | 6/2017 | Seong et al. | |
| 9,701,307 B1 | 7/2017 | Newman et al. | |
| 9,718,468 B2 | 8/2017 | Barfield et al. | |
| 9,731,727 B2 | 8/2017 | Heim et al. | |
| 9,734,414 B2 | 8/2017 | Samarasekera et al. | |
| 9,734,455 B2 | 8/2017 | Levinson et al. | |
| 9,767,625 B1 | 9/2017 | Snyder et al. | |
| 9,812,016 B2 | 11/2017 | Oremus | |
| 9,845,097 B2 | 12/2017 | Prakah-Asante et al. | |
| 9,851,214 B1 | 12/2017 | Chintakindi | |
| 9,852,019 B2 | 12/2017 | Ashani | |
| 9,881,218 B2 | 1/2018 | Ogata et al. | |
| 9,892,558 B2 | 2/2018 | Troy et al. | |
| 9,928,432 B1* | 3/2018 | Sathyanarayana | H04N 5/247 |
| 9,977,973 B2 | 5/2018 | Okuda et al. | |
| 10,078,333 B1 | 9/2018 | Bajracharya | |
| 10,565,873 B1* | 2/2020 | Christensen | H04W 4/029 |
| 10,705,521 B2* | 7/2020 | Mere | B60W 30/143 |
| 2001/0018636 A1 | 8/2001 | Mizuno | |
| 2002/0082806 A1 | 6/2002 | Kaub | |
| 2002/0140562 A1 | 10/2002 | Gutta et al. | |
| 2002/0180870 A1 | 12/2002 | Chen | |
| 2002/0198632 A1 | 12/2002 | Breed et al. | |
| 2003/0095140 A1 | 5/2003 | Keaton et al. | |
| 2003/0169907 A1 | 9/2003 | Edwards et al. | |
| 2004/0051659 A1 | 3/2004 | Garrison | |
| 2004/0071319 A1 | 4/2004 | Kikuchi | |
| 2004/0167667 A1 | 8/2004 | Goncalves et al. | |
| 2004/0168148 A1 | 8/2004 | Goncalves et al. | |
| 2004/0258307 A1 | 12/2004 | Viola et al. | |
| 2005/0002558 A1 | 1/2005 | Franke et al. | |
| 2005/0030184 A1* | 2/2005 | Victor | B60K 37/06 340/576 |
| 2005/0060069 A1 | 3/2005 | Breed et al. | |
| 2005/0073136 A1 | 4/2005 | Larsson et al. | |
| 2005/0182518 A1 | 8/2005 | Karlsson | |
| 2005/0234679 A1 | 10/2005 | Karlsson | |
| 2005/0273218 A1 | 12/2005 | Breed et al. | |
| 2005/0273263 A1 | 12/2005 | Egami et al. | |
| 2006/0106534 A1 | 5/2006 | Kawamata et al. | |
| 2006/0186702 A1 | 8/2006 | Kisanuki et al. | |
| 2006/0187305 A1 | 8/2006 | Trivedi et al. | |
| 2006/0247847 A1 | 11/2006 | Carter et al. | |
| 2006/0271287 A1 | 11/2006 | Gold et al. | |
| 2007/0043491 A1 | 2/2007 | Goerick et al. | |
| 2007/0050108 A1 | 3/2007 | Larschan et al. | |
| 2007/0063855 A1 | 3/2007 | Maass | |
| 2007/0100669 A1 | 5/2007 | Wargin et al. | |
| 2007/0120948 A1 | 5/2007 | Fujioka et al. | |
| 2007/0152433 A1 | 7/2007 | Weichenberger et al. | |
| 2007/0154063 A1 | 7/2007 | Breed | |
| 2007/0154100 A1 | 7/2007 | Au et al. | |
| 2007/0159344 A1 | 7/2007 | Kisacanin | |
| 2007/0244640 A1 | 10/2007 | Hirokawa | |
| 2007/0263901 A1 | 11/2007 | Wu et al. | |
| 2007/0280505 A1 | 12/2007 | Breed | |
| 2008/0025568 A1 | 1/2008 | Han et al. | |
| 2008/0049975 A1 | 2/2008 | Stiegler | |
| 2008/0051957 A1 | 2/2008 | Breed et al. | |
| 2008/0075367 A1 | 3/2008 | Winn et al. | |
| 2008/0084283 A1 | 4/2008 | Kalik | |
| 2008/0167814 A1 | 7/2008 | Samarasekera et al. | |
| 2008/0243378 A1 | 10/2008 | Zavoli | |
| 2008/0252412 A1 | 10/2008 | Larsson et al. | |
| 2008/0260207 A1 | 10/2008 | Nagaoka et al. | |
| 2009/0080697 A1 | 3/2009 | Kishikawa et al. | |
| 2009/0175498 A1 | 7/2009 | Kochi et al. | |
| 2009/0244291 A1 | 10/2009 | Saptharishi et al. | |

(56) References Cited

U.S. PATENT DOCUMENTS

| | | |
|---|---|---|
| 2009/0261979 A1 | 10/2009 | Breed et al. |
| 2010/0061591 A1 | 3/2010 | Okada et al. |
| 2010/0100276 A1 | 4/2010 | Fujinawa et al. |
| 2010/0169013 A1 | 7/2010 | Nakamura et al. |
| 2010/0176987 A1 | 7/2010 | Hoshizaki |
| 2010/0209881 A1 | 8/2010 | Lin et al. |
| 2010/0209891 A1 | 8/2010 | Lin et al. |
| 2010/0215254 A1 | 8/2010 | Prokhorov |
| 2010/0217524 A1 | 8/2010 | Oohashi et al. |
| 2010/0225665 A1 | 9/2010 | Ofek et al. |
| 2010/0238009 A1 | 9/2010 | Cook et al. |
| 2010/0312745 A1 | 12/2010 | Tabak |
| 2010/0322507 A1 | 12/2010 | Gunaratne |
| 2011/0128374 A1 | 6/2011 | Shellshear et al. |
| 2011/0137527 A1 | 6/2011 | Simon et al. |
| 2011/0169625 A1 | 7/2011 | James et al. |
| 2011/0245993 A1 | 10/2011 | Goto |
| 2011/0262004 A1 | 10/2011 | Murakami |
| 2011/0301779 A1 | 12/2011 | Shida |
| 2011/0316980 A1 | 12/2011 | Dubbelman et al. |
| 2012/0027258 A1 | 2/2012 | Uchida et al. |
| 2012/0078510 A1 | 3/2012 | Ma et al. |
| 2012/0116676 A1 | 5/2012 | Basnayake et al. |
| 2012/0121161 A1 | 5/2012 | Eade et al. |
| 2012/0122486 A1 | 5/2012 | Day et al. |
| 2012/0123806 A1 | 5/2012 | Schumann et al. |
| 2012/0154425 A1 | 6/2012 | Kim |
| 2012/0185091 A1 | 7/2012 | Field et al. |
| 2012/0197519 A1 | 8/2012 | Richardson |
| 2012/0206596 A1 | 8/2012 | Samarasekera et al. |
| 2012/0263346 A1 | 10/2012 | Datta et al. |
| 2013/0073114 A1 | 3/2013 | Nemat-Nasser et al. |
| 2013/0093886 A1 | 4/2013 | Rothschild |
| 2013/0142390 A1 | 6/2013 | Othmezouri et al. |
| 2013/0147661 A1 | 6/2013 | Kangas et al. |
| 2013/0155229 A1 | 6/2013 | Thornton et al. |
| 2013/0194127 A1 | 8/2013 | Ishihara et al. |
| 2013/0211687 A1 | 8/2013 | Trost et al. |
| 2014/0037138 A1 | 2/2014 | Sato et al. |
| 2014/0049601 A1 | 2/2014 | Pfeil |
| 2014/0139655 A1 | 5/2014 | Mimar |
| 2014/0195477 A1 | 7/2014 | Graumann et al. |
| 2014/0210625 A1 | 7/2014 | Nemat-Nasser |
| 2014/0210978 A1 | 7/2014 | Gunaratne et al. |
| 2014/0213300 A1 | 7/2014 | Spears et al. |
| 2014/0214255 A1 | 7/2014 | Dolgov et al. |
| 2014/0222280 A1 | 8/2014 | Salomonsson et al. |
| 2014/0267703 A1 | 9/2014 | Taylor et al. |
| 2014/0297170 A1 | 10/2014 | Sakima et al. |
| 2014/0300739 A1 | 10/2014 | Mimar |
| 2014/0324281 A1 | 10/2014 | Nemat-Nasser et al. |
| 2014/0379233 A1 | 12/2014 | Chundrlik et al. |
| 2015/0025917 A1 | 1/2015 | Stempora |
| 2015/0049195 A1 | 2/2015 | Ishigaki et al. |
| 2015/0078632 A1 | 3/2015 | Hachisuka et al. |
| 2015/0084757 A1 | 3/2015 | Annibale et al. |
| 2015/0086078 A1 | 3/2015 | Sibiryakov |
| 2015/0109131 A1* | 4/2015 | Lindberg ............ G08B 21/06 340/576 |
| 2015/0110344 A1 | 4/2015 | Okumura |
| 2015/0140991 A1 | 5/2015 | Silver et al. |
| 2015/0154845 A1 | 6/2015 | Wu et al. |
| 2015/0161892 A1 | 6/2015 | Oremus |
| 2015/0213556 A1 | 7/2015 | Haller |
| 2015/0219462 A1 | 8/2015 | Stmper |
| 2015/0221136 A1 | 8/2015 | Shaburova et al. |
| 2015/0228077 A1 | 8/2015 | Menashe et al. |
| 2015/0239482 A1 | 8/2015 | Green et al. |
| 2015/0254603 A1 | 9/2015 | Bashkin |
| 2015/0269438 A1 | 9/2015 | Samarasekera et al. |
| 2015/0274161 A1 | 10/2015 | Stierlin |
| 2015/0284001 A1 | 10/2015 | Watanabe et al. |
| 2015/0294422 A1 | 10/2015 | Carver et al. |
| 2015/0296135 A1* | 10/2015 | Wacquant ........ G06K 9/00261 348/207.11 |
| 2015/0332114 A1* | 11/2015 | Springer ............ G08G 1/167 348/148 |
| 2015/0344030 A1 | 12/2015 | Damerow et al. |
| 2015/0375756 A1 | 12/2015 | Do et al. |
| 2015/0379715 A1 | 12/2015 | Chandrasekar et al. |
| 2016/0063341 A1 | 3/2016 | Ogata et al. |
| 2016/0063761 A1 | 3/2016 | Sisbot et al. |
| 2016/0068143 A1* | 3/2016 | Schanz ............... B60T 7/22 701/70 |
| 2016/0078303 A1 | 3/2016 | Samarasekera et al. |
| 2016/0086021 A1 | 3/2016 | Grohman et al. |
| 2016/0139977 A1 | 5/2016 | Ashani |
| 2016/0147230 A1 | 5/2016 | Munich et al. |
| 2016/0163198 A1 | 6/2016 | Dougherty |
| 2016/0169690 A1 | 6/2016 | Bogovich et al. |
| 2016/0176397 A1 | 6/2016 | Prokhorov et al. |
| 2016/0203373 A1 | 7/2016 | Menashe et al. |
| 2016/0209511 A1 | 7/2016 | Dolinar et al. |
| 2016/0244022 A1 | 8/2016 | Lippman et al. |
| 2016/0253806 A1 | 9/2016 | Imura |
| 2016/0253886 A1 | 9/2016 | Buchholz et al. |
| 2016/0267335 A1 | 9/2016 | Hampiholi |
| 2016/0284078 A1 | 9/2016 | Kim et al. |
| 2016/0297365 A1 | 10/2016 | Nix |
| 2016/0297449 A1 | 10/2016 | Heim et al. |
| 2016/0300242 A1 | 10/2016 | Truong et al. |
| 2016/0305794 A1 | 10/2016 | Horita et al. |
| 2016/0335475 A1 | 11/2016 | Krenzer et al. |
| 2016/0339782 A1 | 11/2016 | Seong et al. |
| 2017/0011529 A1 | 1/2017 | Urashita |
| 2017/0039848 A1 | 2/2017 | Hakeem |
| 2017/0039850 A1 | 2/2017 | Vanden Berg et al. |
| 2017/0043781 A1 | 2/2017 | Prakah-Asante et al. |
| 2017/0048239 A1 | 2/2017 | Jeon et al. |
| 2017/0053167 A1 | 2/2017 | Ren et al. |
| 2017/0053461 A1 | 2/2017 | Pal et al. |
| 2017/0053555 A1 | 2/2017 | Angel et al. |
| 2017/0055868 A1 | 3/2017 | Hatakeyama |
| 2017/0060234 A1* | 3/2017 | Sung ................ G06F 3/1431 |
| 2017/0061222 A1 | 3/2017 | Hoye et al. |
| 2017/0064363 A1 | 3/2017 | Wexler et al. |
| 2017/0080900 A1 | 3/2017 | Huennekens et al. |
| 2017/0088142 A1 | 3/2017 | Hunt et al. |
| 2017/0089710 A1 | 3/2017 | Slusar |
| 2017/0098131 A1 | 4/2017 | Shashua et al. |
| 2017/0101093 A1 | 4/2017 | Barfield et al. |
| 2017/0106869 A1 | 4/2017 | Lavoie et al. |
| 2017/0109828 A1 | 4/2017 | Pierce et al. |
| 2017/0113664 A1 | 4/2017 | Nix |
| 2017/0124476 A1 | 5/2017 | Levinson et al. |
| 2017/0140231 A1 | 5/2017 | Chen et al. |
| 2017/0146801 A1 | 5/2017 | Stempora |
| 2017/0178352 A1 | 6/2017 | Harmsen et al. |
| 2017/0200061 A1 | 7/2017 | Julian et al. |
| 2017/0221149 A1 | 8/2017 | Hsu-Hoffman et al. |
| 2017/0243399 A1 | 8/2017 | Troy et al. |
| 2017/0248952 A1 | 8/2017 | Perkins et al. |
| 2017/0249095 A1 | 8/2017 | Ricci |
| 2017/0253236 A1 | 9/2017 | Hayakawa |
| 2017/0287163 A1 | 10/2017 | Kaufmann et al. |
| 2017/0292848 A1 | 10/2017 | Nepomuceno et al. |
| 2017/0293819 A1 | 10/2017 | Deng |
| 2017/0309072 A1 | 10/2017 | Li et al. |
| 2017/0314954 A1 | 11/2017 | Golding et al. |
| 2017/0345161 A1 | 11/2017 | Takatani et al. |
| 2017/0357257 A1 | 12/2017 | Yang et al. |
| 2017/0357861 A1 | 12/2017 | Okuda et al. |
| 2018/0012085 A1 | 1/2018 | Blayvas et al. |
| 2018/0039862 A1 | 2/2018 | Hyatt et al. |
| 2018/0043829 A1 | 2/2018 | Cordell et al. |
| 2018/0045519 A1 | 2/2018 | Ghadiok et al. |
| 2018/0052515 A1 | 2/2018 | Wanner et al. |
| 2018/0053102 A1 | 2/2018 | Martinson et al. |
| 2018/0075309 A1* | 3/2018 | Sathyanarayana ...... G06V 40/20 |
| 2018/0107882 A1 | 4/2018 | Ogata et al. |
| 2018/0115711 A1 | 4/2018 | Kato et al. |
| 2018/0172454 A1 | 6/2018 | Ghadiok et al. |
| 2018/0176173 A1 | 6/2018 | Keysers et al. |
| 2018/0182187 A1* | 6/2018 | Tong ................ G06K 9/00791 |

(56) References Cited

U.S. PATENT DOCUMENTS

| | | | |
|---|---|---|---|
| 2018/0186366 A1 | 7/2018 | Gordon et al. | |
| 2018/0204111 A1 | 7/2018 | Zadeh et al. | |
| 2018/0229770 A1 | 8/2018 | Kataoka et al. | |
| 2018/0232583 A1 | 8/2018 | Wang et al. | |
| 2018/0239144 A1 | 8/2018 | Woods et al. | |
| 2018/0259353 A1 | 9/2018 | Tsurumi et al. | |
| 2018/0292830 A1* | 10/2018 | Kazemi | G05D 1/0221 |
| 2018/0299893 A1* | 10/2018 | Qin | G05D 1/0246 |
| 2019/0098469 A1* | 3/2019 | Oh | H04W 4/44 |
| 2019/0246036 A1* | 8/2019 | Wu | B60R 11/04 |

FOREIGN PATENT DOCUMENTS

| | | |
|---|---|---|
| GB | 2506365 A | 4/2014 |
| JP | 2007253705 A * | 10/2007 |
| JP | 2007302238 A * | 11/2007 |
| JP | 2008168714 A * | 7/2008 |
| WO | 2014154771 A1 | 10/2014 |
| WO | 2015184578 A1 | 12/2015 |
| WO | 2016135561 A1 | 9/2016 |
| WO | 2016179303 A1 | 11/2016 |
| WO | 2018039560 A1 | 3/2018 |

OTHER PUBLICATIONS

Tashrif et al., "Tracking-Based Detection of Driving Distraction from Vehicular Interior Video," 2016, Publisher: IEEE.*

Extended European Search Report for EP Patent Appln. No. 19760268.3 dated Jul. 21, 2019.

"Which P&C Insurers Have Filed Patents Related to Autonomous Vehicles", Dec. 14, 2016, https://www.cbinsights.com/research/autonomous-vehicle-insurance-patents/?ReillyBrennanFoT, downloaded from the internet on Sep. 4, 2018.

Guo Feng: et al. "Task 3—Evaluating the Relationship Between Near-Crashes and Crashes: Can Near-Crashes Serve as a Surrogate Safety Metric for Crashes?" Virginia Tech Transportation Institute, U.S. Department of Transportation, Sep. 2010., Nov. 6, 2017.

Wei, Lijun , et al., "GPS and Stereovision-Based Visual Odometry: Application to Urban Scene Mapping and Intelligent Vehicle Localization", International Journal of Vehicular Technology, vol. 24, No. 5, Article ID 439074, 17 pages., Jan. 11, 2011.

* cited by examiner

METHOD FOR DETERMINING DRIVING POLICY

CROSS-REFERENCE TO RELATED APPLICATIONS

This application claims the benefit of U.S. Provisional Application No. 62/635,701 filed 27 Feb. 2018, and U.S. Provisional Application No. 62/729,350 filed 10 Sep. 2018, which are incorporated in their entireties by this reference.

TECHNICAL FIELD

This invention relates generally to the automotive vehicle control field, and more specifically to a new and useful method for determining driving policy in the automotive vehicle control field.

BACKGROUND

Automotive accidents are a major cause of deaths and injuries to human drivers. In order to improve safety and significantly reduce the number of fatalities, autonomous driving systems and control methods are being considered as an effective solution. Machine learning can play a significant role in developing such autonomous driving systems and control methods, wherein computing systems can be trained to drive safely and with minimal intervention from human drivers, according to a set of driving behavior rules for various real-world situations that can be collectively defined as driving policy. However, training such systems can require large quantities of accurate and salient data, and data saliency can be difficult to determine without excessive time and expense (e.g., through the use of human labeling, filtering, and/or other manual techniques for determination of data saliency, etc.).

Thus, there is a need in the automotive field to create a new and useful method for determining driving policy. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
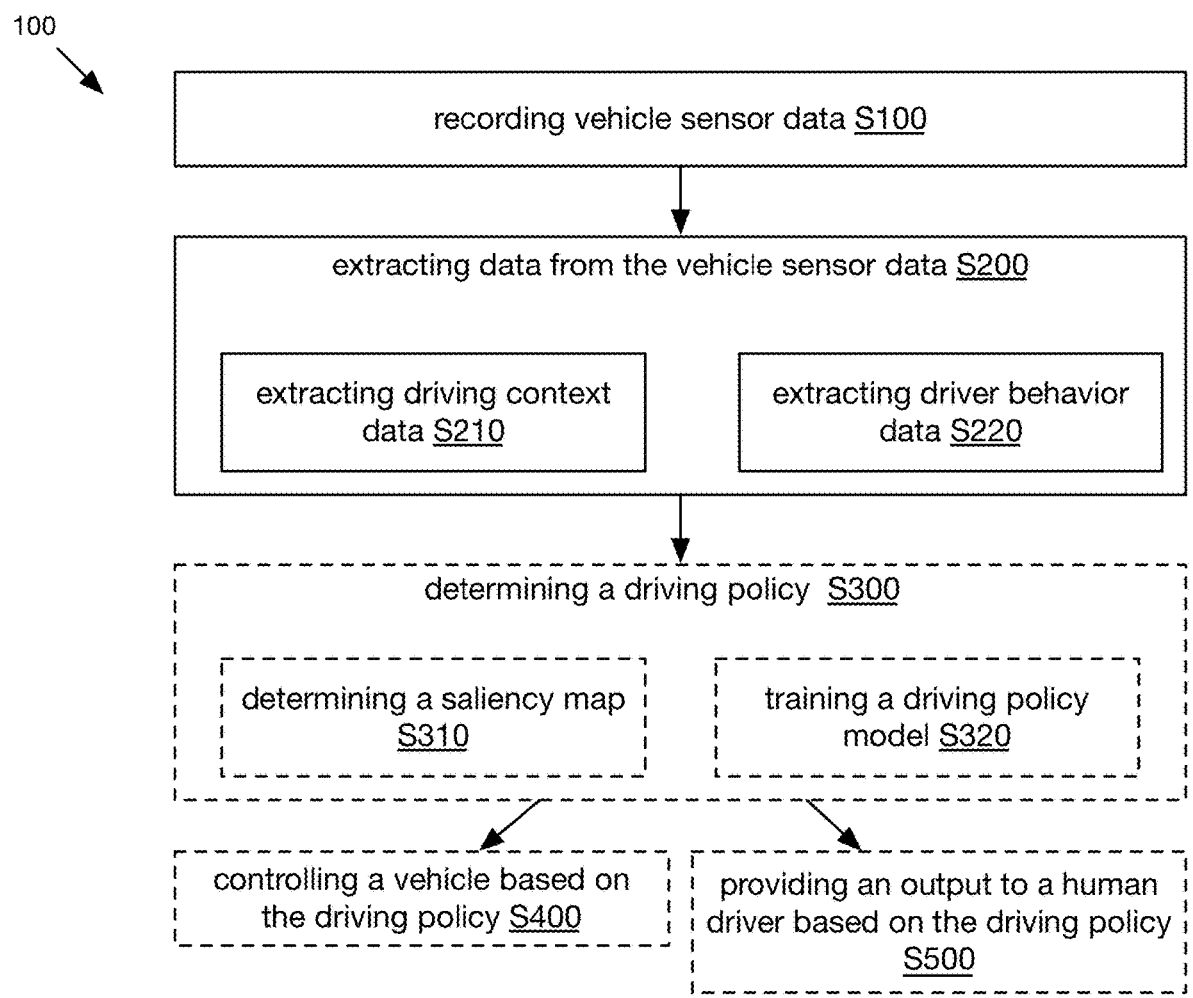
FIG. 1 depicts a flowchart of a variation of the method.
Figure 5A:
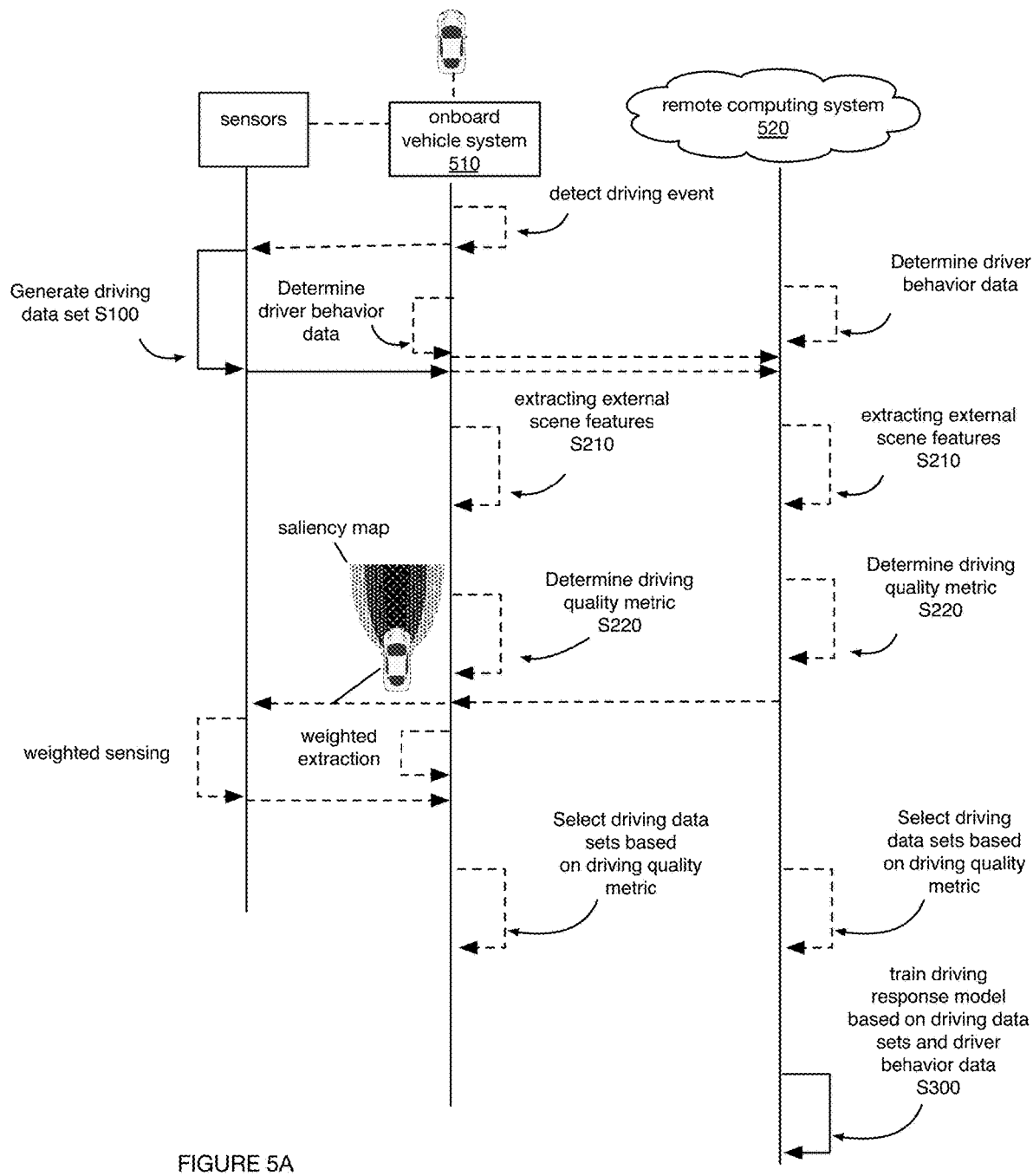
FIGS. 5A-C depict flowchart diagrams of variations of a method.
Figure 5B:
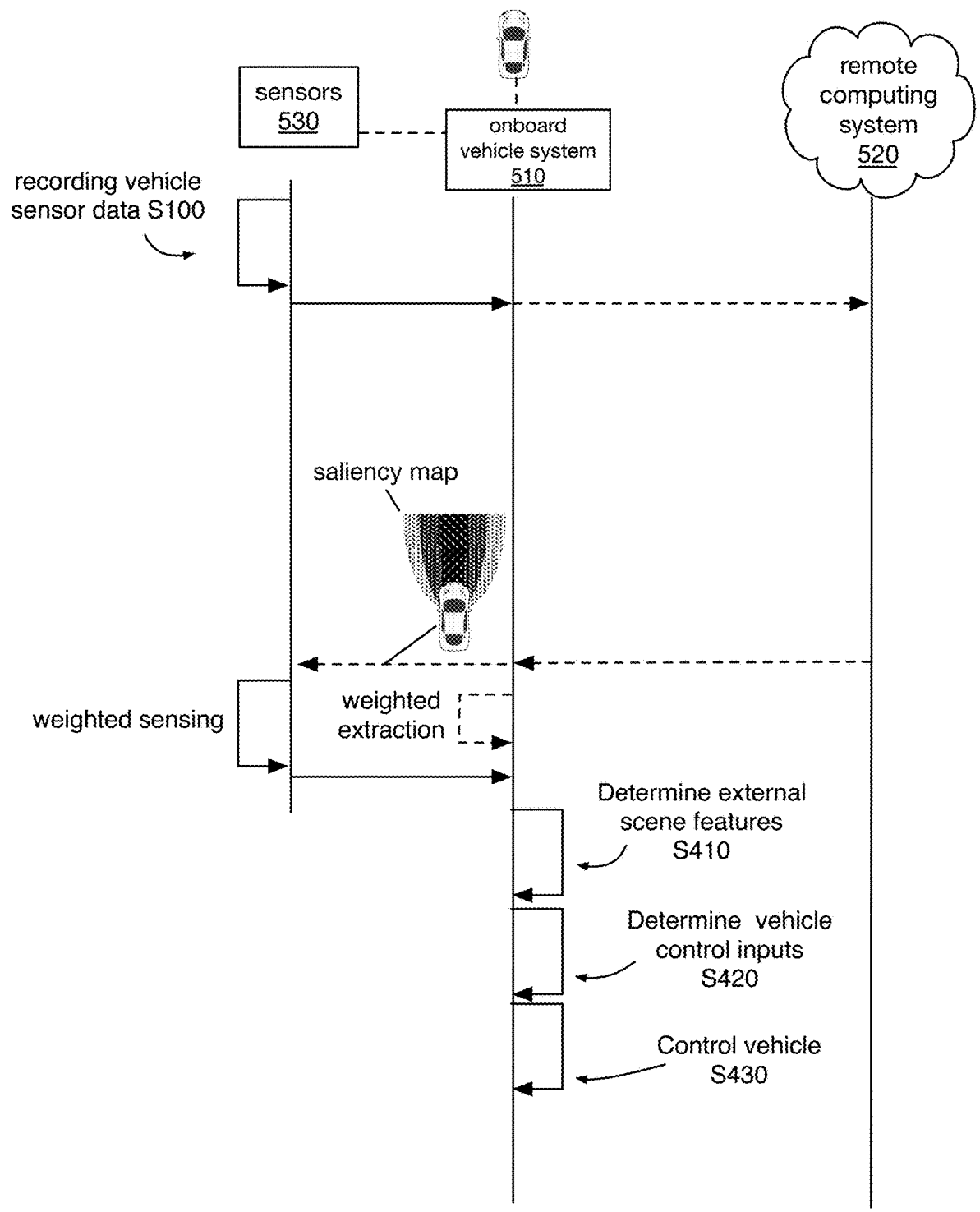
Figure 5C:
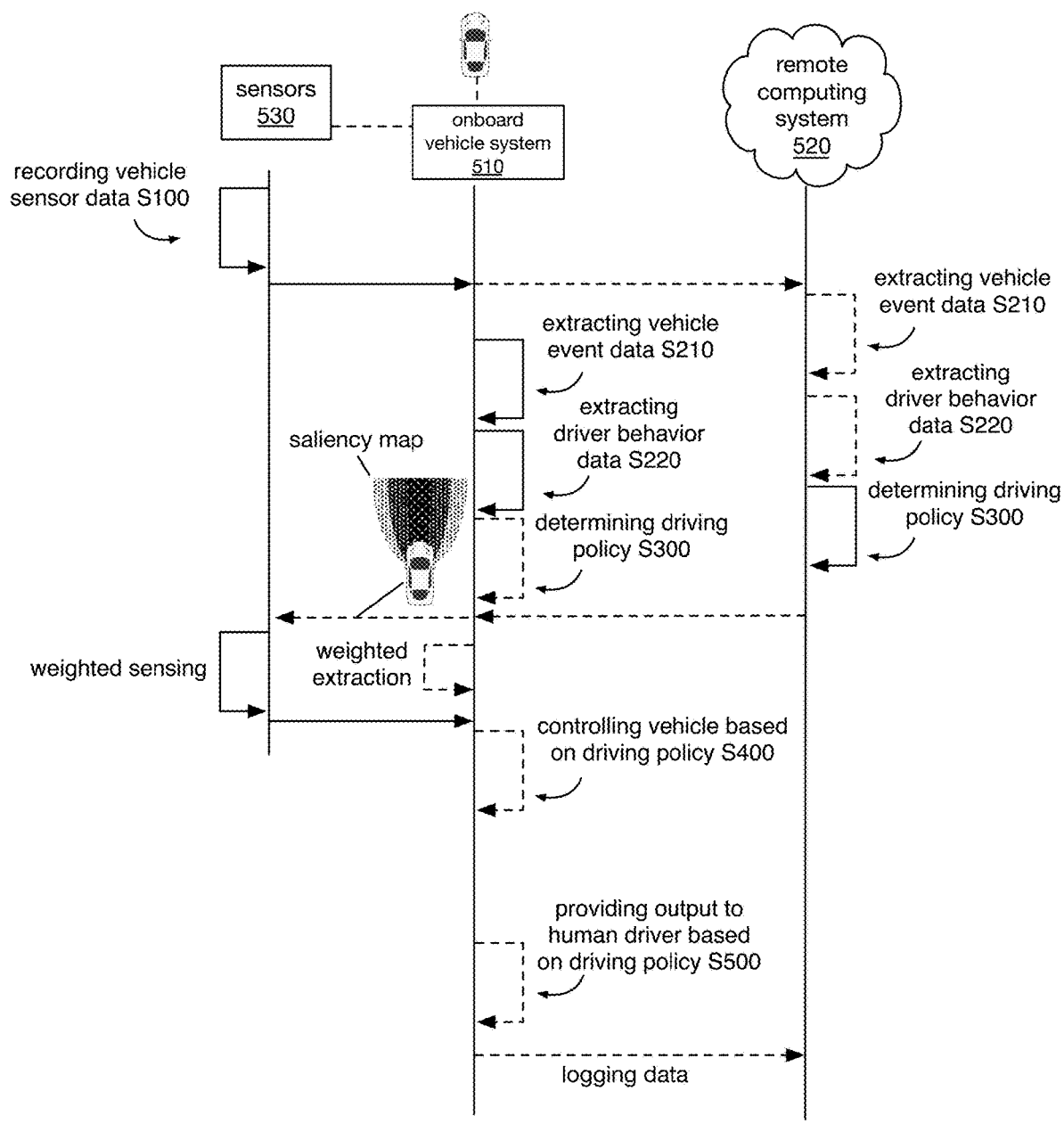

As shown in FIGS. 1 and 5, the method 100 for determining driving policy includes: recording vehicle sensor data at an onboard vehicle system (e.g., 510, shown in FIG. 2) during a vehicle event S100; extracting vehicle event data and driver behavior data from the vehicle sensor data S200; and, determining a driving policy based on the vehicle event data in combination with the driver behavior data S300. The method 100 can optionally include controlling a vehicle (e.g., 501, shown in FIG. 2) based on the driving policy S400, providing output to a human driver based on the driving policy S500, and/or any other suitable blocks or processes.

The method 100 functions to correlate driver behavior with aspects of vehicle events (e.g., by determining the relative saliency of various portions of vehicle events), and to determine driving policy rules based on this correlation that enable vehicle control systems to emulate and/or improve upon the positive aspects of the driving behavior. The method 100 can also function to develop driving policy rules that improve upon the negative aspects of human driving behavior (e.g., human loss of focus or attention, comparatively slow human cognition and/or perception speed, etc.). The method 100 can also function to train models (e.g., driving policy models, inference models, decision making models, etc.) using correlated driver behavior data and vehicle event data (e.g., in the form of a saliency map of the vehicle event at each time point during the vehicle event). In variants, the models can be used to control autonomous or semi-autonomous vehicles, particularly in complex driving environments, such as intersections. The models can make better (e.g., make safer, more efficient, more predictable, etc.) decisions than conventional models, since the models were developed on real-world data collected in similar complex driving environments. In specific examples, the method can leverage human driver behavior during specific driving events to generate data (e.g., labeled data, supervised training data) to train inference systems with real-world naturalistic driving scenarios, such that the resultant models can behave (e.g., react, control vehicles, etc.) similar to or better than human drivers. The method 100 can also function to generate a training dataset (e.g., from saliency-mapped vehicle event data, from vehicle event data labeled using a set of driving policy rules, determined via one or more variations of a portion of the method, etc.) that can be utilized (e.g., by a third party, by an autonomous vehicle system, etc.) for training vehicle control models. The method 100 can also function to control a vehicle (e.g., automatically control an autonomous vehicle) according to a driving policy determined in accordance with one or more variations of a portion of the method. The method 100 can also function to estimate what another human-driven vehicle will do, and can feed said output to a secondary autonomous vehicle control model. The method 100 can also function to improve the performance of a human driver using the output of a driving policy model (e.g., developed based on a population of human drivers, developed based on historical consideration of one or more human drivers over time, etc.), such as by providing the output to the human driver (e.g., real-time coaching via audiovisual stimuli, after-the-fact coaching via summary performance reports, etc.). However, the method 100 can additionally or alternatively have any other suitable function.

1. Benefits

Variations of the technology can afford several benefits and/or advantages.

First, variations of the technology can enable skilled driving behaviors to be identified, recorded, and utilized to generate automated or semi-automated vehicle control systems exhibiting equivalent and/or superior driving skills.

Second, variations of the technology can enable unskilled drivers to improve their skills through coaching based on driving policy determined based on skilled drivers (e.g., without direct interaction between skilled and unskilled drivers, such as through an in-person driver training program).

Third, variations of the technology can enable the training and/or evaluation of computational models for vehicle control according to determined driving policies. For example, the method can include filtering a dataset for vehicle event data associated with skilled driving (e.g., by labeling vehicle event data using a driving policy model generated in accordance with a variation of a portion of the method, using a second scoring model, etc.), and using the filtered dataset to train a vehicle control model to incorporate the methodologies of skilled driving. In other examples, the method can include comparing the output of a vehicle control model to a filtered dataset of vehicle event data associated with skilled driving, and/or to a driving policy model generated using such a filtered dataset, to evaluate the output of the vehicle control model (e.g., use the collected data to test whether a vehicle control model is satisfactory or would make satisfactory vehicle control decisions in complex driving environments). In another example, the collected data can be used to train a model that dictates when and/or whether an autonomous vehicle control system should be disengaged (e.g., when and/or whether a human driver should regain control of the vehicle).

Fourth, variations of the technology can confer improvements in computer-related technology (e.g., vehicle telematics, computational modeling associated with vehicle movement characteristics, etc.) by leveraging non-generic vehicle event data (e.g., extracted from exterior image data, extracted from correlated interior-exterior data, etc.), driver behavior data (e.g., extracted from interior image data, extracted from correlated interior-exterior data, etc.), and/or other suitable data from one or more devices (e.g., non-generalized onboard vehicle systems), sensor systems associated with the vehicle and/or surroundings of the vehicle, and any other suitable systems to improve accuracy of driving policy determination related to vehicle operation and/or vehicle movement characteristics (e.g., which can thereby enable appropriately generated and/or timed user-related actions, vehicle control instructions, etc.). In examples, the technology can confer improvements in the application of such technology by enabling convenient, unobtrusive, accurate, and/or skillful autonomous or semi-autonomous vehicle control matching or exceeding the performance of skilled human drivers, as well as improved vehicle control over time.

Fifth, variations of the technology can provide technical solutions necessarily rooted in computer technology (e.g., utilizing different computational models to determine driving policy based on data streams from sensor systems, etc.) to overcome issues specifically arising with computer technology (e.g., issues surrounding how to leverage correlated interior-exterior image data in association with vehicle events; issues surrounding accurately and appropriately performing control actions for different vehicle events, vehicle event types, and the like; etc.). In another example, the technology can apply computer-implemented rules (e.g., feature engineering rules for processing sensor data into an operable form for generating features; sensor data collection and/or processing rules for data from onboard vehicle systems and/or associated computing devices, mobile devices, sensor systems; etc.).

Sixth, variations of the technology can confer improvements in the functioning of computational systems themselves. For example, the technology can improve upon the processing of collected non-generic data (e.g., by filtering the collected sensor data based on the saliency of the data, enabling the most salient data to be focused upon and processed and the least salient data to be ignored or de-weighted during processing).

Seventh, by collecting training data from real, human-controlled driving sessions, the method can collect naturalistic driving responses in real-world driving contexts. Training autonomous vehicle control models to emulate naturalistic driving responses can be particularly useful in hybrid driving environments where autonomous vehicles share the road with human-driven vehicles, since the human drivers may expect the autonomous vehicles to have human-like responses to driving events.

Eighth, by collecting said data from a plurality of drivers, vehicles, and/or driving sessions, the method can collect data for edge-case driving events (e.g., rare driving events, difficult-to-simulate events, etc.) and/or complex driving environments.

Ninth, by collecting interior data in addition to exterior data, the method can determine the human driver's gaze (e.g., from the interior data) relative to the external scene (e.g., from the exterior data), and determine a region of interest. This region of interest can be used to determine which portion of the external scene to pay attention to (e.g., wherein the region(s) of interest can be used to train an attention model or scanning model that subsequently feeds in to the driving policy model), which can function to reduce the processing resources required to run the driving policy model.

However, variations of the method can offer any other suitable benefits and/or advantages.

2. System

The method can be performed at least in part by a sensing and computing system on-board the vehicle (e.g., an onboard vehicle system, e.g., 510), but can additionally or alternatively be performed at least in part by a remote computing system (e.g., 520 shown in FIG. 2), such as a server system, a user device (e.g., a smartphone, a tablet, etc.), or by any other suitable set or network of computing systems. The method is preferably performed using data sampled by the onboard vehicle system (e.g., vehicle sensor data), but can additionally or alternatively be performed using auxiliary vehicle data (e.g., signals sampled by the other vehicle sensors besides those of the onboard vehicle system, vehicle data retrieved from a database, intrinsic vehicle data associated with the vehicle itself and stored at the onboard vehicle system, etc.), other vehicles' data (e.g., received from the source vehicle, a database, or any other suitable remote computing system), aggregate population data, historic data (e.g., for the vehicle, driver, geographic location, etc.), or any other suitable data from any other suitable source. The onboard vehicle system (e.g., 510) can function to capture, record, or otherwise suitably obtain vehicle sensor data corresponding to the vehicle surroundings during a vehicle event (e.g., the event scene, driving scene, etc.) while simultaneously capturing, recording, or otherwise suitably vehicle sensor data corresponding to the driver (e.g., for use in determining the driver behavior) during a vehicle event. However, the onboard vehicle system can otherwise suitably capture correlated interior-exterior data usable to determine the driving policy of the driver.

The onboard vehicle system (e.g., 510) can include a processing system (e.g., a set of GPUs, CPUs, microprocessors, TPUs, vehicle computing systems, etc.), storage system (e.g., RAM, Flash), communication system, sensor set (e.g., 531-533 shown in FIG. 2), power system (e.g., battery, vehicle power connector, photovoltaic system, etc.), CAN bus interface (e.g., wired or wireless), housing, or any other suitable component. The communication system can include telemetry systems (e.g., for vehicle-to-vehicle, vehicle-to-infrastructure, vehicle-to-remote computing system, or other communications), wireless systems (e.g., cellular, WiFi or other 802.11x protocols, Bluetooth, RF, NFC, etc.), wired systems (e.g., Ethernet, vehicle bus connections, etc.), or any other suitable communication systems. The sensors (e.g., 531-534) shown in FIG. 2) can include: cameras (e.g., wide angle, narrow angle, or having any other suitable field of view; visible range, invisible range, IR, multispectral, hyperspectral, or sensitive along any suitable wavelength; monocular, stereoscopic, or having any suitable number of sensors or cameras; etc.), kinematic sensors (e.g., accelerometers, IMUs, gyroscopes, etc.), optical systems (e.g., ambient light sensors), acoustic systems (e.g., microphones, speakers, etc.), range-finding systems (e.g., radar, sonar, TOF systems, LIDAR systems, etc.), location systems (e.g., GPS, cellular trilateration systems, short-range localization systems, dead-reckoning systems, etc.), temperature sensors, pressure sensors, proximity sensors (e.g., range-finding systems, short-range radios, etc.), or any other suitable set of sensors.

Figure 2:
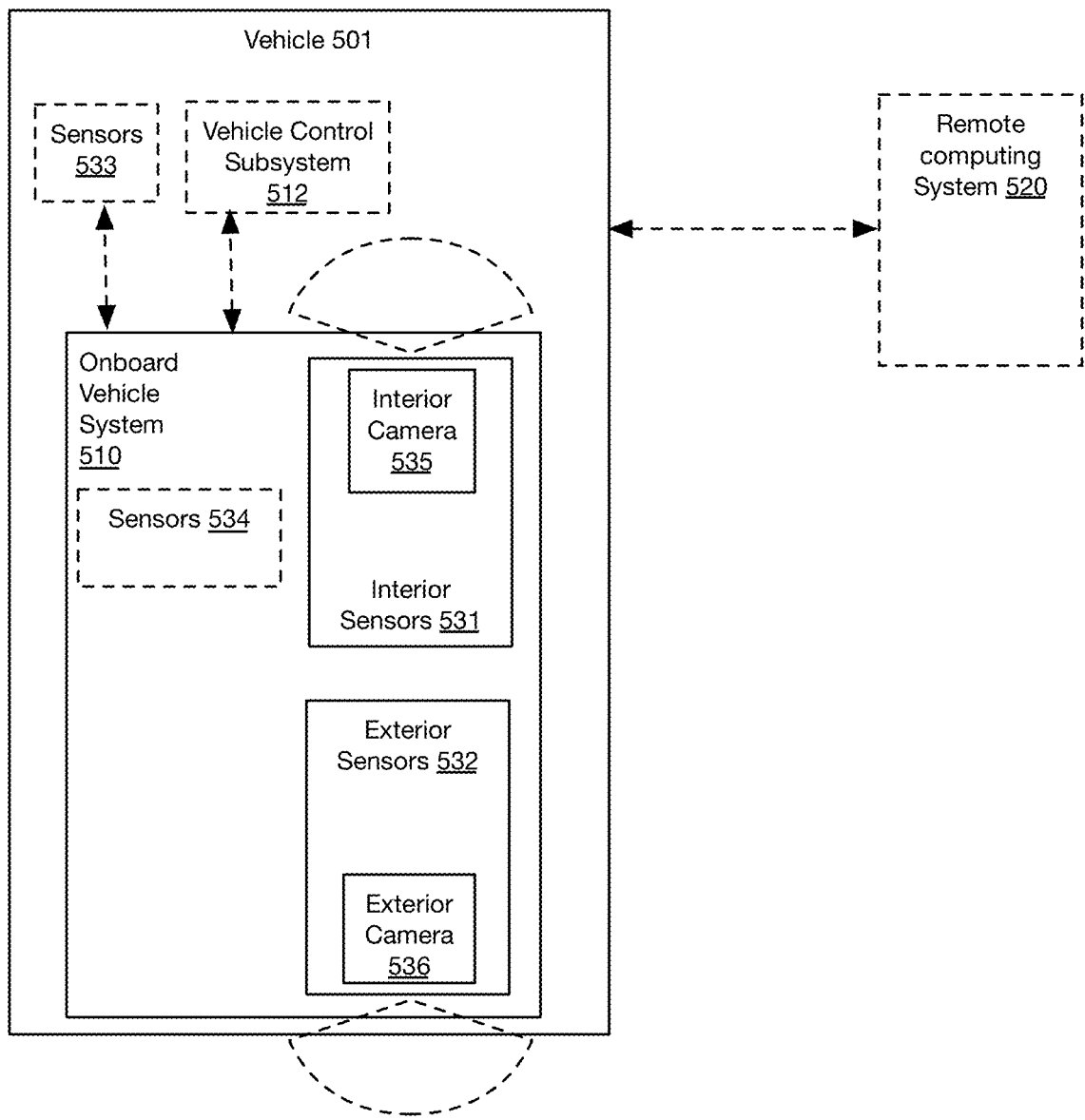
FIG. 2 depicts a schematic diagram of an onboard vehicle system that can be used to implement portions of variations of the method for determining driving policy.

In one variation, an example of which is shown in FIG. 2, the onboard vehicle system 510 at which at least a portion of the method 100 is implemented includes a set of internal sensors (e.g., 531), a set of exterior sensors (e.g., 532), and a processing system. The internal sensors (e.g., internal-facing camera 535, microphones, etc.) can be directed toward and monitor the vehicle interior, more preferably the driver volume (e.g., the volume of the interior in which a vehicle driver is and/or would be situated during driving of the vehicle) but alternatively or additionally any suitable interior volume. The exterior sensors (e.g., exterior-facing camera 536, rangefinding sensors, etc.) are preferably directed outward from the vehicle, and preferably include a region in front of the vehicle (e.g., region preceding the vehicle along the vehicle trajectory, region proximal the driving volume and encompassing the vehicle drivetrain longitudinal vector, etc.), but can alternatively be directed toward the vehicle side(s), top, bottom, rear, or any other suitable region exterior the vehicle and/or including the vehicle surroundings. The sensors are preferably statically mounted to the vehicle 501 and/or each other (e.g., via the housing), but can be movably mounted by a gimbal, damping system, or other motion mechanism.

Each camera's intrinsic parameters are preferably known (e.g., wherein the processing system processing the camera images can store an intrinsic matrix for each camera), but can alternatively be unknown and/or calibrated on-the-fly. The extrinsic parameters relating the internal-facing camera (e.g., included in 531) with the external-facing camera (e.g., included in 532) is preferably also known (e.g., wherein the processing system processing the respective camera images stores an extrinsic matrix for the sensor system), but can alternatively be unknown and/or calibrated on-the-fly. The intrinsic and extrinsic matrices are preferably held constant (e.g., wherein the camera components are assumed to not warp or shift, and the interior-facing camera and the exterior-facing camera are assumed to remain statically coupled by the housing), but can alternatively be dynamically determined or otherwise determined. In one example, a portion of the interior images can be pre-associated with a portion of the exterior images, wherein the mapping can be dynamically determined based on the extrinsic matrix, predetermined (e.g., during calibration), or otherwise determined. The interior-facing camera and exterior-facing cameras are preferably synchronized in time (e.g., by sharing a common clock, calibrating against an external temporal reference, such as a GPS clock, etc.), but the resultant images can be otherwise associated with each other.

In one example, the system can include or interact with an OBD II scanner communicably connected to the onboard vehicle system (e.g., wirelessly, via a wired connection). In a second example, the vehicle ECU(s) can directly communicate with the onboard vehicle system. However, the onboard vehicle system can receive information from the vehicle control system in any other suitable manner.

In variants in which the resultant models (e.g., driving policy models, attention models, scanning models, etc.) are used to control an autonomous vehicle (or semi-autonomous vehicle), the autonomous vehicle preferably includes external sensors (e.g., distance sensors, rangefinding sensors such as LIDAR, cameras, radar, proximity sensors, etc.) and control inputs (e.g., acceleration, braking, steering, etc.), but can additionally or alternatively include interior sensors or any other suitable set of sensors.

In some variations, the onboard vehicle system 510 (and/or autonomous vehicle using the trained model(s)) includes a vehicle control subsystem. In some variations, the onboard vehicle system 510 is communicatively coupled to a vehicle control subsystem (e.g., 512 shown in FIG. 2) that is included in a separate housing from a housing that includes the onboard vehicle system 510. In some variations, the vehicle control subsystem functions to receive control inputs (e.g., control instructions for the control inputs, target control input values, etc.) and control at least one of acceleration, braking, and steering of the vehicle 501 based on the received control inputs. In some variations, the onboard vehicle system 510 is communicatively coupled to the vehicle control system 512 via either a bus or a local network of the vehicle 501.

3. Method

As shown in FIG. 1, the method 100 includes: recording vehicle sensor data at an onboard vehicle system S100; extracting driving context data and driver behavior data from the vehicle sensor data S200; and determining a driving policy based on the driving context data in combination with the driver behavior data S300. The method 100 can optionally include controlling a vehicle based on the driving policy S400; providing output to a human driver based on the driving policy S500; and/or any other suitable blocks or processes.

The method 100 can be performed (e.g., executed, implemented, etc.) in real- or near-real time, but all or portions of the method can alternatively be performed asynchronously or at any other suitable time. The method is preferably iteratively performed at a predetermined frequency (e.g., every millisecond, at a sampling frequency, etc.), but can alternatively be performed in response to occurrence of a trigger event (e.g., change in the vehicle attitude, change in user distraction levels, receipt of driving session information, receipt of new sensor information, physical vehicle entry into a geographic region associated with high collision risk, object proximity detection, detection of an onset or end of a driving session, etc.), be performed a single time for a driving session, be performed a single time for the vehicle, or be performed at any other suitable frequency.

One or more variations of the method 100 can be performed for each of a plurality of vehicles, such as vehicles equipped with an onboard vehicle system as described herein (e.g., 510, shown in FIG. 2), and can be performed for a plurality of driving sessions and/or drivers, thereby generating data sets across multiple vehicles, drivers, and/or driving sessions.

Block S100 includes recording vehicle sensor data. In some variations, the vehicle sensor data is recorded during a driving session. Block S100 functions to obtain data indicative of the surroundings of a vehicle and the actions of the driver in relation to the surroundings during a driving-related scenario (e.g., a vehicle event, driving context). The vehicle sensor data is preferably recorded using an onboard vehicle system (e.g., 510) as described above; however, vehicle sensor data can additionally or alternatively be recorded using any suitable sensor system, integrated with and/or distinct from the vehicle (e.g., 501) itself (e.g., the host vehicle, the ego-vehicle, etc.). Vehicle sensor data is thus preferably indicative of the surroundings of a host vehicle and of the interior of the host vehicle (e.g., 501). The collected vehicle sensor data can be associated with: one or more driving contexts, a driver identifier, a driving session, and/or any other suitable information.

Block S100 functions to record vehicle sensor data that can be used to generate a driving data set for each of a plurality of human-driven vehicles. In some variations, each driving data set includes sensor data for at least one driving session or driving event of a vehicle. In some variations, each driving data set includes sensor data for at least one maneuver of a driving session. In some variations, at least one maneuver is associated with information indicating a skill metric. In some variations, each driving data set includes sensor information for determining at least one of: a driver ID for each driving data session, a driver attentiveness score for each driving session, a skill metric (e.g., for the driver, for a maneuver), a driver attentiveness score for each driving event represented by the driving data set, and/or any other suitable upstream analysis.

In some variations, driving data sets can be tagged one or more of: driving event data (e.g., data indicating a detected event associated with the driving data set), data indicating a driving maneuver performed by the human driver in response to an event, driver ID of the driver, the driver control inputs (e.g., acceleration, braking, steering, signaling, etc.), and/or any other suitable data. The driver control inputs can be the vehicle control inputs applied by the driver: simultaneously with driving data set sampling (e.g., encompass the same timeframe as or be within the timeframe of the driving data set); contemporaneous with driving data set sampling (e.g., encompass a timeframe overlapping or encompassing the driving data set timeframe); within a predetermined time window of driving data set sampling (e.g., a predetermined time window after the driving data set timeframe, such as the next 10 seconds, next 30 seconds, next minute, the next 5 minutes, the next 10 minutes, the time window between 10 seconds to 5 minutes after the driving data set timeframe, etc.); or be the control inputs applied by the driver at any other suitable time relative to the driving data set timeframe. The driving data sets can be tagged or be associated with the data by: the onboard vehicle system 510, the remote computing system 520), and/or any other suitable system.

In some variations, the vehicle sensor data is recorded during a vehicle event. In some variations, the vehicle sensor data is continuously recorded. In some variations, the vehicle sensor data is discontinuously recorded at periodic or irregular sampling intervals.

Vehicle sensor data collected in accordance with Block S100 can include synchronous data (e.g., temporally synchronous, spatially synchronized or correlated, etc.) captured from at least two cameras: a first camera (e.g., 536, shown in FIG. 2) oriented to image outside the vehicle, and a second camera (e.g., 535, shown in FIG. 2) oriented to image within the vehicle. The vehicle sensor data can additionally or alternatively include location data (e.g., GPS data), motion data (e.g., inertial measurement unit/IMU data), and any other suitable type of sensor data. The synchronized sensor data (e.g., from inside and outside cameras) can be used to correlate driver activities (e.g., driver behavior) to events that are happening outside the vehicle (e.g., vehicle events, diving scenarios, etc.). Vehicle sensor data that is collectively aggregated from one or more data streams preferably includes two-way video data (e.g., inward facing video camera data and outward facing video camera data), and can also include inertial data, gyroscope data, location data, routing data, kinematic data, and other suitable vehicle telemetry data (e.g., collected from an OBD II port via a suitable data connection). However, vehicle sensor data can include any other suitable data.

In some variations, Block S100 includes sampling synchronized interior sensor data and exterior sensor data for inclusion in a driving data set, as described herein, that also includes vehicle control inputs (e.g., acceleration, steering, braking, signaling, etc.) associated with the synchronized interior sensor data and exterior sensor data.

In some variations, block S100 includes detecting one or more predetermined driving events at a vehicle, and sampling the synchronized interior sensor data and exterior sensor data (as described herein) after detecting at least one predetermined driving event. Driving events can include vehicle arrival at an intersection, the vehicle being tailgated by another vehicle, the vehicle tailgating another vehicle, traffic, the vehicle being cut-off by another driver, and the like.

In some variations a single sensor sampling is performed in response to detection of a driving event. In some variations, several sensor samplings are performed in response to detection of a driving event (e.g., continuous or discontinuous sampling within a predetermined time period or until a stopping condition is satisfied). In some variations, interior sensor data and exterior sensor data are both image data, and at least one predetermined driving event is detected based on sensor data other than the image data of the vehicle (auxiliary sensor data). Auxiliary sensor data can include data generated by kinematic sensors (e.g., accelerometers, IMUs, gyroscopes, etc.), optical systems (e.g., ambient light sensors), acoustic systems (e.g., microphones, speakers, etc.), range-finding systems (e.g., radar, sonar, TOF systems, LIDAR systems, etc.), location systems (e.g., GPS, cellular trilateration systems, short-range localization systems, dead-reckoning systems, etc.), temperature sensors, pressure sensors, proximity sensors (e.g., range-finding systems, short-range radios, etc.), or any other suitable set of sensors.

In some variations, the interior sensor data includes image data captured by an interior camera (e.g., 535) oriented to image the vehicle interior. In a first variation, the interior image data included in the driving data set include complete frames of captured interior image data. In a second variation, the interior image data included in the driving data set include cropped frames of captured interior image data. For example, a driver face can be identified in the frames of the interior image data, the frames of the interior image data can be cropped to the identified driver face, and the cropped frames can be included in the driving data set instead of the full frames, such a size of the driving data set can be reduced as compared to a driving data set that includes the full (un-cropped) interior image data. In a first example, the cropped frames can be used to determine driving context (e.g., an identification of a current driver, presence of a human driver). In a second example, the cropped frames can be used to determine driver behavior (e.g., gaze, head pose, attentiveness, etc.) of a current driver.

In some variations, the exterior sensor data includes image data captured by an exterior camera (e.g., 536) oriented to image outside the vehicle. In some variations, the exterior sensor data includes LIDAR data captured by a LIDAR systems oriented to a scene outside the vehicle. In some variations, the exterior sensor data includes a point cloud dataset representing a scene outside the vehicle as sensed by a LIDAR system.

In some variations, the external scene representation (extracted from the exterior sensor data) can be converted to the output format for a secondary sensor suite (e.g., using a translation module, such as a depth map-to-point cloud converter; etc.). The secondary sensor suite is preferably that of the autonomous vehicle using the trained model(s), but can be any other suitable set of sensors. This translation is preferably performed before external scene feature extraction and/or model training, such that the trained model will be able to accept features from the secondary sensor suite and is independent from the onboard vehicle system's sensor suite and/or features extracted therefrom. However, the translation can be performed at any suitable time, or not performed at all. In some examples, block S100 includes generating a LIDAR point cloud dataset representing a scene outside the vehicle from image data captured by an exterior camera oriented to image outside the vehicle.

The method can optionally include determining the driving context associated with a set of vehicle sensor data.

The driving context can be used in multiple ways. In one variation, the vehicle sensor data is collected upon occurrence of a predetermined driving context (e.g., the current driving context satisfying a predetermined set of conditions). This can function to minimize the amount of data that needs to be stored on-board the vehicle and/or the amount of data that needs to be analyzed and/or transmitted to the analysis system. The driving policy model trained using such data can be specific to the predetermined driving context, a set thereof, or generic to multiple driving contexts. Examples of predetermined driving contexts include: vehicle proximity to complex driving locations, such as intersections (e.g., wherein the vehicle is within a geofence associated with an intersection, when the external sensor measurements indicate an intersection, etc.); vehicle events; autonomous control model outputs having a confidence level lower than a threshold confidence; complex driving conditions (e.g., rain detected within the external image or by the vehicle's moisture sensors); or any other suitable driving context.

In a second variation, the driving context (e.g., driving context features) is used as the training input, wherein the driver's control inputs (e.g., concurrent with the driving context or subsequent the driving context, within a predetermined timeframe, etc.) are used as the data label. However, the driving context can be otherwise used.

Driving context can include: driving event(s), location (e.g., geolocation), time, the driving environment (e.g., external scene, including the position and/or orientation of external objects relative to the host vehicle and/or estimated object trajectories; ambient environment parameters, such as lighting and weather, etc.), vehicle kinematics (e.g., trajectory, velocity, acceleration, etc.), next driving maneuver, urgency, or any other suitable driving parameter. The driving context can be determined: in real-time, during the driving session; asynchronously from the driving session; or at any suitable time. The driving context can be determined using: the onboard vehicle system, a remote computing system, and/or any other suitable system. The driving context can be determined based on: the vehicle sensor data, vehicle control data, navigation data, data determined from a remote database, or any other suitable data.

A vehicle event can include any driving-related, traffic-related, roadway-related, and/or traffic-adjacent event that occurs during vehicle operation. For example, a vehicle event can include an interaction between the ego-vehicle (e.g., the host vehicle, the vehicle on which the onboard vehicle system is located, etc.) and another vehicle (e.g., a secondary vehicle), pedestrian, and/or other static or non-static (e.g., moving) object. An interaction can be a collision, a near-collision, an effect upon the driver of the presence of the secondary vehicle or traffic object (e.g., causing the driver to slow down, to abstain from accelerating, to maintain speed, to accelerate, to brake, etc.), typical driving, arrival at a predetermined location or location class (e.g., location within or proximal to an intersection), and/or any other suitable type of interaction. The vehicle event can include a driving maneuver, performed in relation to the ego-vehicle (e.g., by a driver of the ego-vehicle) and/or a secondary vehicle (e.g., by a driver or operator of the secondary vehicle). A driving maneuver can be any operation performable by the vehicle (e.g., a left turn, a right turn, a lane change, a swerve, a hard brake, a soft brake, maintaining speed, maintaining distance from a leading vehicle, perpendicular parking, parallel parking, pulling out of a parking spot, entering a highway, exiting a highway, operating in stop-and-go traffic, standard operation, non-standard operation, emergency action, nominal action, etc.).

A vehicle event can be of any suitable duration; for example, a vehicle event can be defined over a time period of a driving maneuver, over a time period of a set of related driving maneuvers (e.g., changing lanes in combination with exiting a highway, turning into a parking lot in combination with parking a vehicle, etc.), over a time period encompassing a driving session (e.g., the time between activation of a vehicle and deactivation of the vehicle), continuously during at least a portion of a driving session, of a variable duration based on event characteristics (e.g., over a time period of highway driving that is delimited in real time or after the fact based on recognition of the vehicle entering and/or exiting the highway region), and any other suitable duration or time period associated with a driving session.

A vehicle event can be determined in real time (e.g., during a driving session made up of a plurality of vehicle events) based on collected vehicle sensor data, subsequent to sensor data collection (e.g., wherein data is recorded, sampled, or otherwise obtained in accordance with one or more variations of Block S100) as at least a portion of the vehicle event data extraction of Block S200, and/or otherwise suitably determined.

Vehicle event (driving event) detection can be performed by a model, such as an artificial neural network (e.g., a convolutional neural network), Bayesian model, a deterministic model, a stochastic and/or probabilistic model, a rule-based model, and any other suitable model. Driving event detection is preferably performed, at least in part, onboard the vehicle (e.g., at an onboard vehicle system, a vehicle computing unit, an electronic control unit, a processor of the onboard vehicle system, a mobile device onboard the vehicle, etc.), but can additionally or alternatively be performed at a remote computing system (e.g., a cloud-based system, a remotely-located server or cluster, etc.) subsequent to and/or simultaneously with (e.g., via streaming data) transmission of vehicle sensor data to the remote computing system (e.g., 520).

In some variations, at least one predetermined driving event is detected based on sensor data from any one or combination of sensors described herein, and can be performed by implementing a set of rules in the form of a model, such as an artificial neural network, as described herein. As described herein, driving event detection is preferably performed, at least in part, onboard the vehicle, but can additionally or alternatively be performed at a remote computing system subsequent to and/or simultaneously with transmission of vehicle sensor data to the remote computing system (e.g., 520).

Driving context can additionally or alternatively include the driving environment (e.g., what are the objects in the scene surrounding the vehicle, where such objects are located, properties of the objects, etc.). The driving environment can be continuously or discontinuously sensed, recorded, or otherwise suitably determined. Driving environment determination can be performed, in variations, in response to a trigger (e.g., an event-based trigger, a threshold-based trigger, a condition-based trigger etc.). In further variations, Block S100 can include iteratively recording vehicle sensor data and processing the vehicle sensor data to generate an output that can be used to trigger or otherwise suitably initiate further vehicle sensor data recordation; for example, the method can include: continuously recording image data from an exterior-facing camera (e.g., 536) in accordance with a variation of Block S100; detecting an object in the image data in accordance with Block S200; and, recording interior and exterior image data at an interior-facing camera and the exterior-facing camera, respectively, in response to the object detection (e.g., in accordance with the variation of Block S100 and/or an alternative variation of Block S100). Collecting vehicle sensor data can include sampling at sensors of a sensor system (e.g., onboard vehicle system), receiving sensor data from the vehicle, and/or otherwise suitably collecting sensor data. Any suitable number of sensor streams (e.g., data streams) can be sampled, and sensors can be of various types (e.g., interior IMU sensors and exterior-facing cameras in conjunction, interior and exterior facing cameras in conjunction, etc.).

Block S200 includes extracting driving context data and driver behavior data from the vehicle sensor data. Block S200 functions to process the raw sensor data and derive (e.g., extract) parameters and/or characteristics that are related to the driving context and driver actions during vehicle events.

In some variations, driver behavior data includes vehicle control inputs provided by a human driver (e.g., steering, acceleration, and braking system inputs). The vehicle control inputs are preferably directly received from a vehicle control system of the vehicle, but can alternatively or additionally be inferred from the sensor data (e.g., from the external images using SLAM, from the IMU measurements, etc.). In some variations, the vehicle control inputs are directly received from an OBD (on-board diagnostic) system or an ECU (engine control unit) of the vehicle. The vehicle control inputs can be continuously obtained, or alternatively, obtained in response to detecting at least one predetermined driving event or satisfaction of a set of data sampling conditions.

In some variations, a single set of vehicle control inputs is obtained in response to detection of a driving event (e.g., steering inputs). In some variations, several sets of vehicle control inputs (e.g., steering and acceleration inputs) are obtained in response to detection of a driving event (e.g., within a predetermined time period or until a stopping condition is satisfied).

In relation to Block S200, extracting driving context data and/or driver behavior data can be performed by implementing a set of rules in the form of a model, such as an artificial neural network (e.g., a convolutional neural network), Bayesian model, a deterministic model, a stochastic and/or probabilistic model, and any other suitable model (e.g., any suitable machine learning as described above). Extracting data is preferably performed, at least in part, onboard the vehicle (e.g., at an onboard vehicle system, a vehicle computing unit, an electronic control unit, a processor of the onboard vehicle system, a mobile device onboard the vehicle, etc.), but can additionally or alternatively be performed at a remote computing system (e.g., a cloud-based system, a remotely-located server or cluster, etc.) subsequent to and/or simultaneously with (e.g., via streaming data) transmission of vehicle sensor data to the remote computing system.

Block S200 includes Block S210, which includes extracting driving context from the vehicle sensor data (e.g., sensor data provided by at least one of the sensors 531-536, shown in FIG. 2). Block S210 functions to obtain data describing objects in the external scene (e.g., object parameters, object characteristics, object kinematics, etc.). In one variation, the driving context data can be extracted from the entire external scene captured by the external sensor data. In this variation, the driving context data can be extracted in a manner agnostic to the attention paid by the driver (e.g., irrespective of driver attention on objects as determined in one or more variations of Block S220, unweighted by region of interest/ROI, etc.), or otherwise account for driver attention. In a second variation, the driving context data can be extracted from the region of the external scene encompassed by the driver's region of interest, or be otherwise influenced by driver behavior. In a third variation, the driving context data can be extracted from a region of the external scene associated with other driving context data. For example, the driving context data can be extracted from the ahead, right, then left regions of the external scene for data sets associated with an intersection. In a second example, the driving context data can be extracted from the ahead, the front left, and the front right regions of the external scene for data sets associated with near-collision events. However, driving context data can additionally or alternatively (e.g., in a second instance of Block S210 after generation or determination of a driving policy) be extracted based on a driving policy (e.g., taking into account a region of interest or weighting of various portions of the geospatial scene or time period of the vehicle event based on a driving policy).

In relation to Block S210, driving context data can include any data related to vehicle operation, vehicular traffic (e.g., near-miss or near-collision events; traffic operations such as merging into a lane, changing lanes, turning, obeying or disobeying traffic signals, etc.), data describing non-vehicular objects (e.g., pedestrian data such as location, pose, and/or heading; building locations and/or poses; traffic signage or signal location, meaning, pose; etc.), environmental data (e.g., describing the surroundings of the vehicle, ambient light level, ambient temperature, etc.), and any other suitable data. However, driving context data can include any other suitable data related to vehicle events, driving events, driving scenarios, and the like.

Block S210 can include performing simultaneous localization and mapping (SLAM) of the host vehicle. Mapping can include localizing the host vehicle within a three-dimensional representation of the driving context (e.g., a scene defining the positions and trajectories of the objects involved in the vehicle event).

Block S210 can include extracting object parameters from the vehicle sensor data. Object parameters can include object type (e.g., whether an object is a vehicle, a pedestrian, a roadway portion, etc.), object intrinsic characteristics (e.g., vehicle make and/or model, object shape, object size, object color, etc.)

Block S210 can include extracting vehicle event data by determining that a combination of sampled measurement values substantially matches a predetermined pattern indicative of known vehicle operational behavior (e.g., performing curve fitting on a curve of acceleration versus time curve to identify a predetermined pattern and/or a set of curve features known to correspond to a vehicle turning through a certain subtended angle). In a second variation, extracting driving context data includes translating data received from an OBD II port of the vehicle (e.g., using a lookup table). In a third variation, extracting vehicle operational data includes determining vehicle speed and direction by implementing a set of rules that track road markings and/or landmarks in collected imagery as the markings and/or landmarks move through a sequence of image frames (e.g., using optical flow image processing, classical computer vision processing, trained machine-learning-based computer vision, etc.). In a fourth variation, extracting driving context data includes determining the location of the vehicle by combining GPS and inertial information (e.g., using IMU data used for dead-reckoning localization, using image data for extraction of inertial or motion information, etc.). In a fifth variation, extracting driving context data includes estimating a vehicle speed and/or acceleration based on microphone measurements of an audible vehicle parameter (e.g., an engine revolution parameter or revolutions per minute, a road noise parameter or decibel level of background noise, etc.). However, extracting driving context data can include otherwise suitably determining data describing agents, objects, and time-series states associated with aspects of a driving context based on collected vehicle sensor data.

Block S210 can include extracting, from exterior sensor data (e.g., image data, LIDAR data, and the like) of a driving data set, external scene features of an external scene of the vehicle (e.g., 501) represented by the exterior sensor data of a driving data set. In some variations, extracting scene features from the exterior sensor data is performed at the onboard vehicle system (e.g., 510). In some variations, the onboard vehicle system (e.g., 510) transmits the exterior sensor data to a remote computing system (e.g., 520), and the remote computing system extracts the external scene features.

In some variations, external scene features are extracted from one or more portions of the exterior sensor data that correspond to a region of interest (ROI) of the external scene of the vehicle (e.g., 501), and the features extracted from an ROI are used to train a driving response model, as described herein. Alternatively, the external scene features can be extracted from the full frame(s) of the external image(s). However, the external scene features can be extracted from any other suitable portion of the external scene and/or representation thereof.

In some variations, regions of interest of the external scene are determined at the onboard vehicle system (e.g., 510). In some variations, the onboard vehicle system (e.g., 510) transmits the exterior sensor data to a remote computing system (e.g., 520), and the remote computing system determines regions of interest of the external scene. However, the ROI can be determined by any other suitable system.

In a first variation, one or more regions of interest of the external scene are determined based on driver attention of a human driver of the vehicle. In some variations, the driver attention is determined based on interior image data (sensed by an interior facing camera, e.g., 535) that is synchronized with the exterior sensor data. In some variations, the exterior sensor data is image data. In this manner, external scene features used to train the model can be features that correspond to features that a vehicle driver believes to be important. By filtering out external scene features based on importance to a human driver, a driving response model can be more accurately trained to emulate driving of a human.

In a second variation, one or more regions of interest of the external scene are determined based on external driving context data and/or the type of detected event (e.g., vehicle presence at an intersection, detection of a near-collision event, detection of tailgating, detection of hard braking, detection of hard steering, detection of quick acceleration, detection of a pedestrian, detection of an intended lane change, etc.). For example, in a case of the driving context data indicating the presence of the host vehicle at an intersection, the forward, right, then left regions of the external scene can be determined as regions of interest for the external scene (e.g., in sequence). As another example, in a case of driving context data indicating a forward near-collision event, an forward region of the external scene can be determined as a region of interest for the external scene. As another example, in a case of driving context data indicating a forward near-collision event, the right, then left regions of the external scene can be determined as regions of interest, thereby providing scene information that can be used to evaluate an evasive left or right turn maneuver.

In some variations, a region of interest in the external scene is identified by determining a saliency map, as described herein. In some variations, the saliency map is a collection of saliency scores associated with the external scene of the vehicle represented by the exterior sensor data (e.g., image data, LIDAR data, and the like) sampled at block S100. In some variations, the saliency scores are associated with a driving event that corresponds to the external sensor data (e.g., a driving event that triggered collection of the external sensor data, a driving event detected at a time corresponding to a time associated with the external sensor data, etc.). In some variations, each saliency score corresponds to a spatiotemporal point with the external scene represented by the external sensor data. Variations of saliency maps are described herein with respect to block S310. In some variations, each saliency score is proportional to a duration of intensity of attention applied by the driver of the vehicle to the spatiotemporal point, as indicated by the driver's eye gaze and/or head pose (e.g., the direction of a driver's eye gaze, the angular orientation of a driver's head, etc.) extracted from the series of interior images (e.g., over time) (sensed by an interior facing camera, e.g., 535) that are synchronized with the exterior sensor data. Regions of interest (e.g., to the driver, to the model) within the external scene can be defined within the saliency map based on the saliency scores. For example, a region of the saliency map can be defined as a region of interest (e.g., associated with a particular time and/or region of space of the vehicle event) if the saliency score exceeds a threshold value at each spatiotemporal point in the region.

In some variations, each determined region of interest (ROI) of the external sensor data can be used to train a region of interest (ROI) model (e.g., attention model, scanning model) that returns a region of interest in a 3D (external) scene or a region of interest in the exterior-facing image. The ROI model can ingest a set of external scene features (e.g., wherein the external scene features can be used as the input), auxiliary sensor data, and/or any other suitable information, and output an external scen ROI, set thereof, or series thereof for analysis. The ROI model can be trained on a data set including: external scene features, auxiliary sensor data, and/or any other suitable information of driving data sets, associated with (e.g., labeled with) the ROIs determined from the respective driving data sets. In some variations, driving data sets used to train the ROI model are filtered based on an associated driving quality metric (e.g., filtered for "good" drivers or "good" driving behaviors). In some variations, a driving quality metric is determined for each candidate driving data set, wherein the candidate driving data sets having a driving quality metric satisfying a predetermined set of conditions (e.g., higher than a threshold quality score, lower than a threshold quality score, having a predetermined quality classification or label, etc.) are selected as training data sets to be used to train the ROI model. In some variations, driving data sets used to train the ROI model are filtered on an event associated with the driving data set, and the filtered driving data sets are used to train an event-specific ROI model. However, any other suitable driving data set can be used to train the ROI model.

In some variations, block S210 is performed at the onboard vehicle system (e.g., 510); however, Block S210 can be otherwise suitably performed at any other suitable system and/or system components.

Block S200 includes Block S220, which includes extracting driver behavior data from the vehicle sensor data e.g., sensor data provided by at least one of the sensors 531-536 shown in FIG. 2). Block S220 functions to determine actions taken by the driver while operating the vehicle (e.g., driving the vehicle, occupying the vehicle while the vehicle is running, etc.). Block S220 can also function to determine a distraction level of the driver. Block S220 can include determining driver (e.g., vehicle) control inputs (e.g., acceleration, steering, braking, signaling, etc.), determining occupant (e.g., driver and/or passenger) data, and determining a driver distraction factor (e.g., a value characterizing a level of driver distraction), each of which can be performed substantially simultaneously, asynchronously, periodically, and/or with any other suitable temporal characteristics. Block S220 is preferably performed at the onboard vehicle system (e.g., 510); however, Block S220 can be otherwise suitably performed at any other suitable system and/or system components. Block S220 is preferably performed using sensor signals (e.g., images of the vehicle interior, measurements, etc.) concurrently sampled with the signals (e.g., exterior images) from which vehicle events are extracted, but can alternatively or additionally be sampled before, after, or at any suitable time relative to the signals from which the vehicle events are extracted.

In some variations, driver behavior is determined based on vehicle behavior (e.g., hard braking, hard steering, fast acceleration, erratic driving behavior, etc.). In a first example, vehicle control inputs of a driver can be inferred without receiving explicit vehicle control inputs provided by the driver. Instead, vehicle behavior (such as movement of the vehicle, activation of vehicle turn signals, etc.) as determined by vehicle sensor data, can be used to infer control of the vehicle by the driver. For example, if sensor data indicates that the vehicle is moving left, a steer-left vehicle control input provide by the driver can be inferred. In another example, movement of the vehicle can be characterized (e.g., sudden stopping, sudden turning, fast acceleration, erratic movement, etc.) based on vehicle sensor data, and the movement of the vehicle can be used to determine a driving behavior of the driver (e.g., hard braking, hard steering, fast acceleration, erratic driving behavior, etc.).

Block S220 can include can include extracting interior activity data. Extracting interior activity data includes extracting data from a data stream (e.g., an image stream, a gyroscopic data stream, an IMU data stream, etc.) that encodes information concerning activities occurring within a vehicle interior. Such interior activity data can include driver activity (e.g., driver gaze motion, driver hand positions, driver control inputs, etc.), passenger activity (e.g., passenger conversation content, passenger speaking volume, passenger speaking time points, etc.), vehicle interior qualities (e.g., overall noise level, ambient light level within the cabin, etc.), intrinsic vehicle information perceptible from within the vehicle (e.g., vibration, acoustic signatures, interior appointments such as upholstery colors or materials, etc.), and any other suitable activity data related to the vehicle interior and/or collected from within the vehicle (e.g., at the onboard vehicle system).

In variations, determining driver behavior can include determining (e.g., via gaze direction analysis of the vehicle sensor data) the driver's comprehension of the vehicle surroundings during the vehicle event and correlating the driver's attention to various portions of the surroundings with the dynamics of the vehicle event (e.g., via saliency mapping).

In variants, determining the driver gaze direction can be difficult because there is no ground truth to determine which object or scene region of interest that the user is gazing at (e.g., because this would require drivers to label the scene region of interest while driving). In one embodiment, the method can extract the driver's eye gaze and/or head pose (e.g., the direction of a driver's eye gaze, the angular orientation of a driver's head, etc.) from a series of interior images (e.g., over time) to infer scanning patterns from the driver. The scanning pattern can be used to determine the range of the scene (e.g., from the extremities of the scanning pattern), or otherwise used (e.g., to determine whether the driver is scanning a region of interest that a region of interest model, trained on a simulation or historic data from one or more drivers, identifies). The system can further use the scanning pattern to infer the regions (regions of interest) in the external scene that the user is looking at, based on the gaze direction (determined from the interior-facing camera) and the camera calibration parameters (e.g., relating the interior and exterior cameras, such as the extrinsic matrix). These regions can optionally be used to generate a training dataset, which can include: interior images annotated for gaze, and exterior images annotated for region of interest (e.g., the region that the driver was looking at).

Driver and/or operator behavioral data can include: operator profiles (e.g., history, driver score, etc.); operator behavior (e.g., user behavior), such as distraction level, expressions (e.g., surprise, anger, etc.), responses or actions (e.g., evasive maneuvers, swerving, hard braking, screaming, etc.), cognitive ability (e.g., consciousness), driving proficiency, willful behavior (e.g., determined from vehicle control input positions), attentiveness, gaze frequency or duration in a predetermined direction (e.g., forward direction), performance of secondary tasks (e.g., tasks unrelated to driving, such as talking on a cell phone or talking to a passenger, eating, etc.), or other behavior parameters; or any other suitable operator parameter.

Block S220 can include determining an intended action of a driver. For example, Block S220 can include determining that the driver intends to change lanes based on the driver performing a series of actions including scanning a region to the side of the vehicle (e.g., in the lane-change direction), checking a blind spot to the side of the vehicle (e.g., in the lane-change direction), and other suitable preparatory actions related to lane changing. In another example, Block S220 can include determining that a driver intends to brake based on a decision tree populated with possible actions based on vehicle event data (e.g., extracted in accordance with one or more variations of Block S210). In a third example, the intended actions can be determined from navigational systems (e.g., a driving directions client or application).

Block S220 can optionally include determining one or more driving actions of the driver. The driving actions can be associated with the vehicle event, the driver behaviors, and/or any other suitable information, wherein the associated dataset can be used to train the driving policy model(s) and/or any other suitable models. The driving actions are preferably the actions that the driver takes in response to the vehicle event, but can alternatively be actions that the driver takes before and/or after the vehicle event. In one example, the driving actions can be a driving maneuver (e.g., right turn, left turn, reverse, driving straight, swerving, etc.) that the driver took after the vehicle event (e.g., arrival at an intersection, occurrence of a near-collision event, etc.). However, the driving actions can be otherwise defined. The driving actions can be determined from: the interior images, the exterior images, vehicle controls (e.g., determined from the CAN bus, etc.), vehicle ego-motion, signals sampled by an exterior sensor (e.g., a sensor on a second vehicle), or otherwise determined.

Block S220 can include determining an attention level of a driver associated with an object described by the vehicle event data. For example, Block S220 can include calculating the time duration that a driver has directed his or her gaze at an object or region present in the vehicle surroundings (e.g., a cross-street outlet, a secondary vehicle, a traffic signal, etc.). However, Block S220 can include otherwise suitably determining a driver's attention level in any other suitable manner. Determining the attention level can function to provide an input for determining a saliency score for a point or region in space during a driving event.

In some variations, block S200 includes determining a driving quality metric for a driving data set. In some variations, determining a driving quality metric is performed at the onboard vehicle system (e.g., 510). In some variations, the onboard vehicle system (e.g., 510) transmits a driving data set to a remote computing system (e.g., 520), and the remote computing system determines a driving quality metric for the driving data set.

In some variations, a driving quality metric includes one or more of a driver attentiveness score, a maneuver skill metric, an overall skill metric for a driving session of a driving data set, an overall skill (e.g., across multiple driving sessions) of a driver as identified in a profile, and a ride comfort metric.

In some variations, at least one of the onboard vehicle system 510 and the remote system 520 determines a driver attentiveness score. In a first variation, a region of interest model is used to determine the attentiveness score. The attentiveness score is determined by determining a region in a scene represented by the exterior image data that the driver (of the driving data set) is looking at based an eye gaze of the driver extracted from the interior image data, uses a region of interest (ROI) model (as described herein) to identify at least one region of interest from the exterior sensor (e.g., image) data, and determines the driver attentiveness score by comparing a region the driver is looking at to regions determined by the ROI model.

In a second variation, the driver attentiveness score is determined by using commonly accepted driving standards. The driver attentiveness score is determined by determining a region in a scene represented by the exterior image data that the driver (of the driving data set) is looking at based an eye gaze of the driver extracted from the interior image data, and comparing where the driver is looking to what the driver should be looking at according to commonly accepted driving standards. In one example, the driver attentiveness can be determined using the methods disclosed in U.S. application Ser. No. 16/239,326 filed 3 Jan. 2019, incorporated herein in its entirety by this reference.

In some variations, determining a region in a scene represented by the exterior image data that the driver (of the driving data set) is looking at determining (e.g., via gaze direction analysis of the interior image data) the driver's comprehension of the vehicle surroundings and correlating the driver's attention to various portions of the scene represented by the exterior sensor data with the dynamics of the vehicle event (e.g., via saliency mapping).

Determining driver attention can include calculating the time duration that a driver has directed his or her gaze at an object or region present in the exterior scene (e.g., a cross-street outlet, a secondary vehicle, a traffic signal, etc.). Determining the attention level can function to provide an input for determining a saliency score for a point or region in space (represented by the exterior sensor data) during a driving event.

In some variations, the driver's eye gaze and/or head pose (e.g., the direction of a driver's eye gaze, the angular orientation of a driver's head, etc.) is extracted from a series of interior images (e.g., over time) (sensed by an interior facing camera, e.g., 535) that are synchronized with the exterior sensor data to infer scanning patterns from the driver. The range of the external scene can be determined from the extremities of the scanning pattern. The scanning pattern can be used to infer the regions (regions of interest) in the external scene that the user is looking at, based on the gaze direction (determined from the interior-facing camera, e.g., 535) and the camera calibration parameters (e.g., relating the interior camera 535 and exterior camera 536, such as the extrinsic matrix). These regions can optionally be used to generate a driving dataset for a vehicle (as described herein), which can include: interior images annotated for gaze, and exterior images annotated for region of interest (e.g., the region that the driver was looking at).

In some variations, determining a region in a scene represented by the exterior image data that the driver (of the driving data set) is looking at based an eye gaze of the driver extracted from the interior image data includes: determining whether the driver is looking at locations of high saliency based on detecting the driver's gaze in the interior image data.

The attentiveness score can be determined in response to detection of a vehicle event, and the attentiveness score can indicate whether the human driver is looking in a direction of high saliency for the detected vehicle event. For example, if a driver is intending to make a right turn at an intersection, while the exterior-facing camera captures the other object trajectories in relation to the path of the host vehicle, the interior-facing camera can capture whether the driver was looking in the correct directions to suitably execute the right turn. A trained region of interest (ROI) model (as described herein) can be used to determine the locations of high saliency in external sensor data (e.g., image data, point cloud) that represents an external scene. Determining the attentiveness score can be performed in real-time during vehicle operation, or subsequent to a driving action performed by a human driver.

At least one of the onboard vehicle system 510 and the remote system 520 determines a skill of a maneuver associated with the driving data set. In a first variation, a trained driving policy model is used to determine the skill of a maneuver. The skill of a maneuver is determined by comparing a driver's driving actions of the maneuver (identified for the driving data set) with driving actions determined by a trained driving policy model (as described herein) from the synchronized interior sensor data and exterior sensor data of the driving data set.

Determining a skill of a maneuver by using a trained driving policy model can optionally include: the driving response model receiving a region of interest (ROI) for a scene represented by exterior sensor data and the external sensor data; and outputting a driving action for the maneuver to be compared with the driver's driving actions of the maneuver (identified for the driving data set). In some variations, the trained ROI model receives the exterior sensor data and the interior image data as inputs, and the outputs the ROI for the scene based on these inputs.

In a second variation, a skill of a maneuver associated with the driving data set is determined by comparing a driver's driving actions of the maneuver (identified for the driving data set) with commonly accepted driving standards.

In some variations, a driver skill of the driver of the driving data is determined based on a stored driver profile that specifies a skill of the driver. The driver profile can be stored at the remote computing system 520. A driver ID of the driver is used to retrieve the stored driver profile and identify the drive skill. In a first variation, at least one of the onboard vehicle system 510 and the remote system 520 determines a driver ID of the driver of the driving data set based on the interior image data. At least one of the onboard vehicle system 510 and the remote system 520 can tag the driving data set with the determined driver ID. At least one of the onboard vehicle system 510 and the remote system 520 can tag the driving data set with the retrieved driver skill.

In a third variation, the driving quality score can be determined based on a ride comfort metric of a driving session associated with a driving data set. The ride comfort metric can be determined based on sensor data included in the driving data set (e.g., lateral acceleration, G forces, etc.), or otherwise determined. In this manner, a driving policy model can be trained to generate driving actions that result in an autonomous vehicle driving in a comfortable manner, as opposed to a jerky manner that might cause discomfort to a passenger.

Block S300 includes determining a driving response model (e.g., driving policy model). S300 functions to generate a model that outputs naturalistic driving behaviors (e.g., driving policy). S300 is preferably performed by the remote computing system, but can alternatively be performed at the onboard vehicle system (e.g., 510) or at any other suitable system. In some variations, the onboard vehicle system (e.g., 510) transmits a driving data set (and, optionally, external scene features extracted from the driving data set) to a remote computing system (e.g., 520), and the remote computing system determines a driving policy by using the driving data set.

In some variations, determining a driving policy includes training a driving response model based on the extracted vehicle event data and driver behavior data.

The driving response model is preferably a convolutional neural network, but can alternatively be a deep neural network, a Bayesian model, a deterministic model, a stochastic and/or probabilistic model, a rule-based model, and any other suitable model or combination thereof. The driving response model is preferably trained using reinforcement learning, but can alternatively be trained using supervised learning, unsupervised learning, or otherwise trained.

In some variations, block S300 includes accessing driving data sets for a plurality of human-driven vehicles. Each driving data set includes synchronized interior sensor data and exterior sensor data, and vehicle control inputs associated with the synchronized interior sensor data. The interior sensor data can include interior image data. The exterior sensor data can include 2-D image data, 3-D image data, a point cloud (e.g., LIDAR output data), and the like. The driving data sets can include driving data sets for a plurality of vehicles, driving sessions, drivers, driving contexts, and the like. In some variations, one or more driving data sets include information indicating at least one of the following for the driving data set: a driving event, a vehicle identifier, a driver identifier, a driving session, driving context information, a driving quality metric, a driver score, a driver skill, a driver profile, and the like.

In some variations, block S300 includes selecting (from a plurality of driving data sets) driving data sets having a driving quality metric that satisfies a predetermined set of conditions, and training a driving response model based on external scene features (block S210) extracted from the selected driving data sets and the vehicle control inputs from the selected driving sets.

In some variations, the predetermined conditions can include driver performance score thresholds indicating a level of driver skill (e.g., an overall driver skill, a driver skill for a driving session, a skill for a particular maneuver of the driving data set, and the like). A driver skill can be assigned to each maneuver in a driving data set, and the driving data set can be selected for use in training based on the skills assigned to the maneuvers, or alternatively, portions of a driving data set corresponding to maneuvers having skill levels above a threshold can be selected for use in training. A driving data set for a driving session for a driver having an overall driving skill (as defined in a driver profile) can be selected for use in training. A driving data set for a driving session for a driver having a driving skill (determined for the driving session of the driving data set) can be selected for use in training, regardless of an overall driver skill for the driver as determined from previous driving sessions.

In some variations, predetermined conditions can include attentiveness score thresholds indicating a level of driver attentiveness.

In some variations, predetermined conditions can include ride comfort thresholds.

In some variations, predetermined conditions can include driving context features. For example, the method can include identifying data sets associated with a predetermined driving event; identifying data sets associated with a predetermined ambient driving environment; identifying data sets associated with a predetermined time of day; identifying data sets associated with a predetermined location or location class (e.g., intersection, freeway, traffic, etc.); or any other suitable set of driving context features.

Block S300 includes selecting driving data sets based on driving quality metric. In some variations, bock S300 is performed at the onboard vehicle system (e.g., 510). In some variations, the onboard vehicle system (e.g., 510) transmits a driving data set to a remote computing system (e.g., 520), and the remote computing system selects the driving data sets based on diving quality metric.

In some variations, driving data sets used to train the driving response model are filtered on an event associated with the driving data set, and the filtered driving data sets are used to train an event-specific driving response model.

In some variations, block S300 functions to determine a driving policy based on the driving context data in combination with the driver behavior data. In some variations, Block S300 functions to convert driver behavior in various driving scenarios (e.g., determined in accordance with one or more variations of Block S200) to a set of context-based decision-making rules that collectively define a driving policy. The driving policy can be implemented as a model (e.g., a set of explicitly programmed rules that process the inputs of vehicle event data and output a set of desirable driver behavior, a trained or trainable machine-learning model, a combination of probabilistic and deterministic rules and/or parametric equations, etc.) or otherwise suitably implemented.

In relation to Block S300, the driving policy can be generated based on the driver actions during a vehicle event. For example, a vehicle event can include making a turn at an intersection, and the driver actions can include the locations and/or regions towards which the driver is looking over the time period leading up to and including making the turn. The exterior-facing camera of the onboard vehicle system can simultaneously capture the trajectories of secondary vehicles traversing the roadway proximal the intersection, and Block S300 can include first, determining that the right turn was skillfully executed (e.g., efficiently and safely executed) and second, designating the regions that received the driver's attention during the vehicle event as regions of interest and also designating the driver control inputs in relation to the driving maneuver as components of the driving policy.

Block S300 can include Block S310, which includes: determining a saliency map of the vehicle event based on the driver behavior data. Block S310 functions to associate a saliency (e.g., saliency score, saliency metric, relative saliency, absolute saliency, etc.) with each spatiotemporal component of a vehicle event, for use in determining a driving policy for the vehicle event.

Block S310 can include determining a saliency score corresponding to a spatiotemporal point, and defining a saliency map as the collection of saliency scores associated with the vehicle event. The spatiotemporal point can be a physical region of finite or infinitesimal extent, and can be defined over any suitable time duration (e.g., an instantaneous point in time, a time period within a vehicle event, a time period including the entire vehicle event, etc.). The saliency score (e.g., saliency metric) can be a relative score (e.g., normalized to any suitable value, such as to, representing the peak saliency score defined in the saliency map of the vehicle event), an absolute score (e.g., defined proportional to the duration and intensity of attention applied by the driver to the spatiotemporal point during the vehicle event), and/or otherwise suitably defined.

Figure 3:
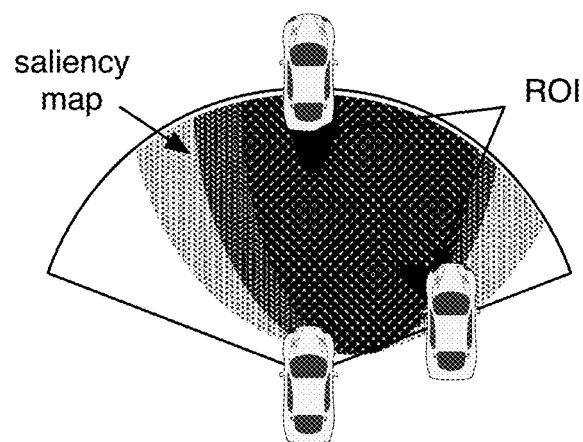
FIG. 3 depicts a schematic diagram of a saliency map associated with an example implementation of the method for determining driving policy.

The saliency map can be: an array of saliency metric values (e.g., for each sub-region identifier), a heat map (e.g., stored or visualized as a heat map, as shown in FIG. 3), an equation, or be otherwise structured. The saliency map(s) or parameters thereof (e.g., factor values, weights, geolocations, etc.) can be stored temporarily (e.g., long enough to analyze the instantaneous saliency of a driver action or behavior), for the vehicle event duration, for the driving session duration, for longer than the driving session, or for any suitable time period. All or a subset of the generated saliency maps or parameters thereof can be stored. The saliency maps (or parameters thereof) can be stored in association with a vehicle identifier or characteristic (e.g., a map of the visibility of the vehicle surroundings by a driver situated within the vehicle), geographic location or region identifier, operator identifier, vehicle kinematics, or any other suitable factor values. The saliency map can be a physical mapping (e.g., to points in physical space) and/or a conceptual mapping (e.g., to objects identified and tracked in the context of the vehicle event), or otherwise suitably defined.

Figure 4:
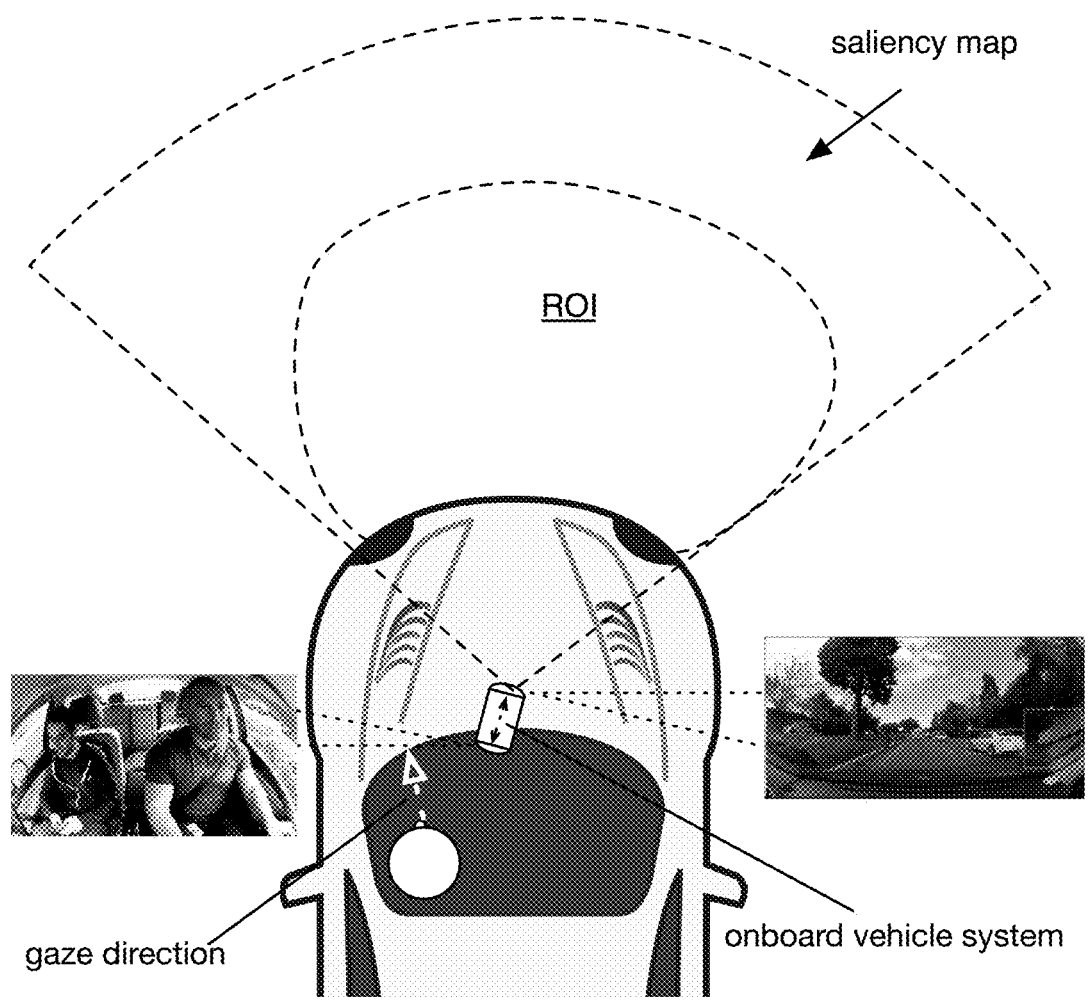
FIG. 4 depicts a schematic of a portion of an example implementation of the method for determining driving policy.

As shown in FIG. 4, Block S310 can include defining a region of interest within the saliency map based on the saliency score(s). For example, a region of the saliency map of the vehicle event can be defined as a region of interest (e.g., associated with a particular time and/or region of space of the vehicle event) if the saliency score exceeds a threshold value at each spatiotemporal point in the region. In examples, the driving policy can generate the region(s) of interest as output(s) based on the context of the vehicle (e.g., defined in the vehicle event data).

Block S300 can include Block S320, which includes training a driving policy model based on the vehicle event data in combination with the driver behavior data. Block S320 functions to codify the driver behavior in various driving contexts (e.g., vehicle events), across one or more drivers, into a driving policy model that can be applied to similar driving contexts (e.g., vehicle events) occurring elsewhere and/or at a different time.

Figure 6A:
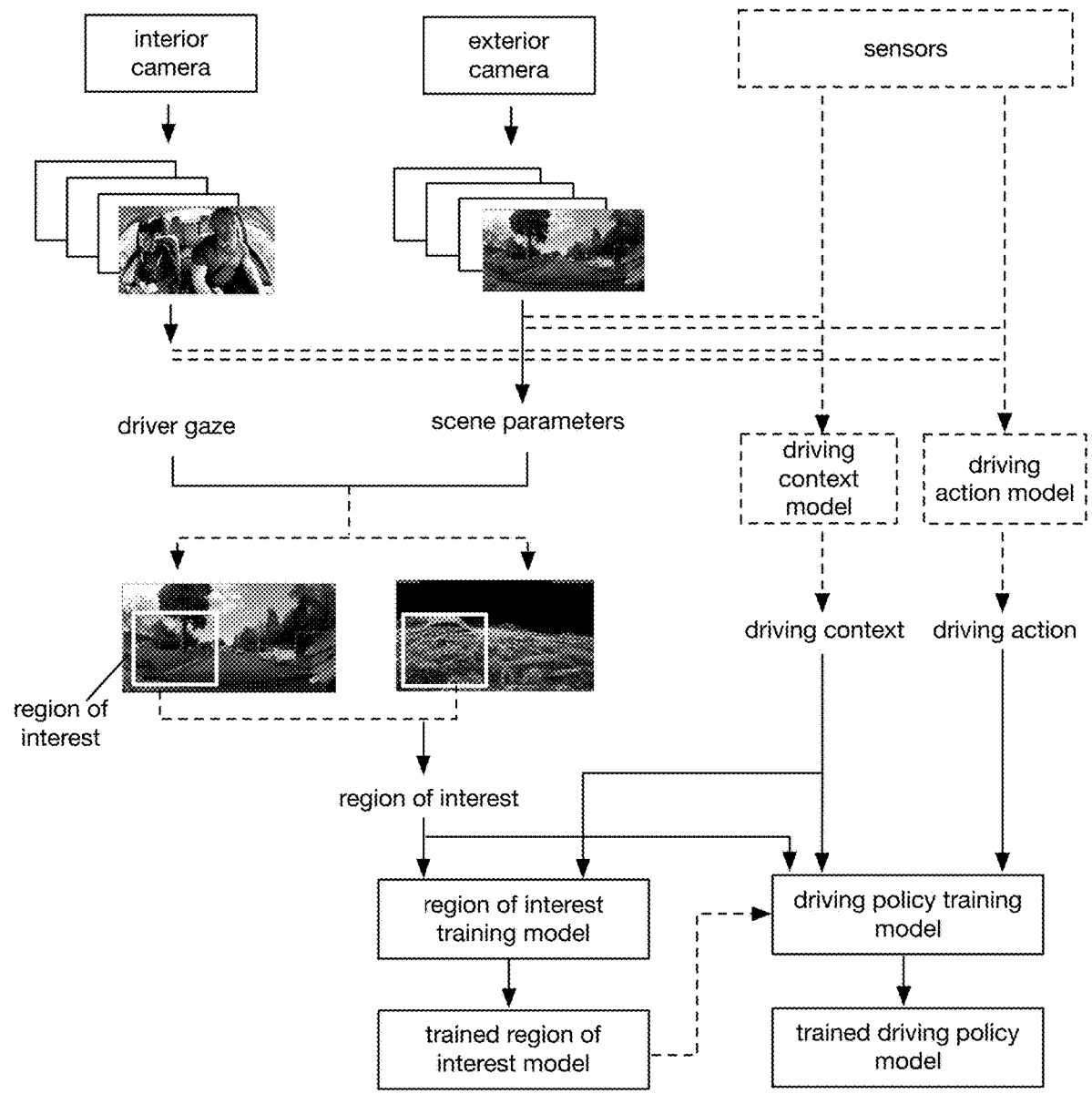
FIGS. 6A and 6B depict specific examples of model training and use, respectively.

In examples, the synchronized interior-exterior data (e.g., collected in accordance with one or more variations of Block S100) can be used to train models (e.g., subsequent to suitable factorization into inputs in accordance with one or more variations of Block S200) via a training or learning process to generate vehicle control models that function to maneuver the vehicle in the presence of multiple objects in complex driving scenarios (e.g., such as intersections). For example, the method can include determining whether a driver (e.g., a skilled driver, highly-scored driver) was looking in the correct direction(s) during a particular driving maneuver, and training a model to heavily weight the regions corresponding to the directions in which the driver was looking in similar driving maneuvers in similar contexts. In a second example (specific example shown in FIG. 6A), the method can include: identifying data associated with both vehicle events of interest (e.g., data associated with intersection geotags, near-collision labels, etc.), wherein the data can include the vehicle event data (e.g., driving context data, such as external objects, object poses, vehicle kinematics, intended next action, etc.), the associated (e.g., contemporaneous) driver behavior (e.g., gaze direction, etc.), and the driver action (e.g., actions taken at the intersection, in response to the near-collision event, etc.); extracting features from the dataset (e.g., vehicle event features, driver behavior features, driver action features); and training one or more models based on the extracted features. The data can optionally be filtered for data generated by "good" drivers (e.g., driving data generated by drivers with a driver score above a predetermined threshold, drivers having a skill level or score above a predetermined threshold associated with a driver profile, etc.), but can optionally include any other suitable driving data.

In a specific example, the vehicle event features and the driver behavior features can be used to train a region of interest model that returns a region of interest in a 3D (external) scene or a region of interest in the exterior-facing image, given a set of vehicle event features (e.g., wherein the vehicle event features can be used as the input, and the driver behavior features can be used as the desired output in the labeled training set).

Figure 6B:
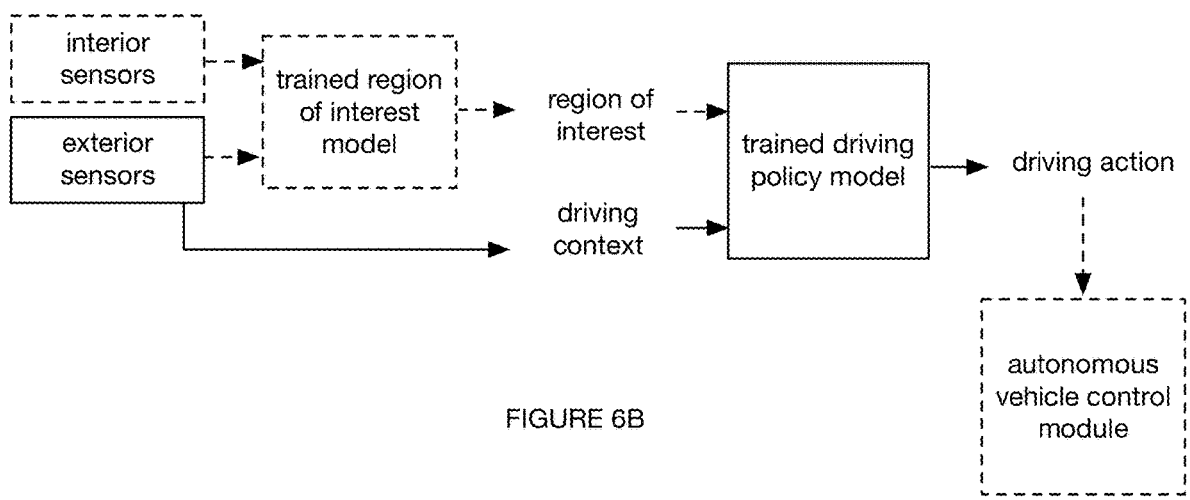

In a second specific example, the region(s) of interest (regions of the exterior images, regions of the 3D external scene, etc.), optionally obstacle features of the obstacles detected in the region(s) of interest, and the driver actions can be used to train a driving policy model that returns a driving action, given a set of regions of interest and/or obstacle features (specific example shown in FIG. 6B). The driving action can be used to: control vehicle operation, score human drivers, or otherwise used. The region(s) of interest can be a single frame or a series of regions. Image processing, object detection, pose detection, trajectory determination, mapping, feature extraction, and/or any other suitable data can be determined using conventional methods, proprietary methods, or otherwise determined. The model thus trained can then control a host vehicle to execute driving maneuvers by analyzing the vehicles that were of interest (e.g., based on the heavily weighted regions, which are chosen based upon what the human driver was monitoring in similar maneuvers.

Block S320 can include generating a training dataset based on the driving policy (e.g., generated using a driving policy model). The training dataset can include synchronized interior-exterior data annotated based on the driving policy (e.g., wherein the exterior imagery is annotated with a saliency map or saliency scores, and the interior imagery is annotated with gaze direction), and/or any other suitable data for training a computational model based on the driving policy.

In a variation, Block S320 includes training a driving policy model embodied as a computational learning network (e.g., a convolutional neural network) for vehicle control using vehicle event data weighted by driver attention (e.g., according to a saliency map of each vehicle event determined in accordance with one or more variations of Block S310), such that the network learns to focus on certain regions of interest in the vehicle event data. The regions of interest can be physical regions (e.g., geolocation regions) within a scene depicted in vehicle sensor data, temporal regions of interest (e.g., time periods of interest during vehicle events), and/or otherwise suitably defined.

The method can include Block S400, which includes controlling a vehicle based on the driving policy (example shown in FIG. 6B). Block S400 functions to implement the driving policy in conjunction with vehicle operation (e.g., autonomous operation, semi-autonomous driving, etc.). Controlling the vehicle based on the driving policy can include implementing the decision output of a driving policy model (e.g., developed based on decisions made by a human driver, by an autonomous control system, etc.) in a driving scenario where there are multiple objects with associated dynamics and behaviors provided to the driving policy model as inputs.

Block S400 can include examining the vehicle surroundings (e.g., objects in the scene imaged by the onboard vehicle system) to determine a preferred option for navigating the vehicle (e.g., among candidate navigation routes) amidst the agents (e.g., obstacles, objects, etc.) occupying the vehicle surroundings, and controlling the vehicle in real-time based on the determined navigation option (e.g., route).

In some variations, controlling an autonomous vehicle includes: determining external scene features from a set of external scene information S410, providing the external scene features to a driving response model (e.g., trained using the methods described above) to determine vehicle control inputs for the autonomous vehicle S420, and controlling the autonomous vehicle based on the vehicle control inputs S430. In some variations, the driving response model is trained as described herein with respect to block S300. In some variations, the driving response model is trained on historic driving data sets for historic human-driven vehicles. In some embodiments, the historic driving data sets are constructed as described herein in relation to blocks S100 and S200. In some variations, the historic driving data sets are associated with driving quality metrics satisfying predetermined set of conditions, as described herein in relation to block S300. In some variations, historic driving data sets include historic external scene features extracted from historic external images, and historic vehicle control inputs associated with the historic external images.

In some variations, the driving response model is specific to a driving event, and auxiliary sensor data (as described herein) of the vehicle is monitored for occurrence of the driving event. In response to occurrence of the driving event, the driving response model is selectively executed, the external scene features are selectively provided to the driving response model, and the outputs of the driving response model (e.g., control inputs) can be fed into the autonomous vehicle control model and/or used to control autonomous vehicle operation.

In some variations, auxiliary sensor data is provided to a scanning model (region of interest model) that determines a region of interest (ROI) in an external scene represented by the external scene information, and the external scene features are extracted from the determined ROI. The external scene features (and/or features from other external scene regions) are then fed to the driving response model. In a specific example, when features from both the ROI and the other regions are fed to the driving response model, the features from the ROI can be higher-resolution, more accurate, higher-weighted, preferentially analysed, or otherwise differ from the other features. Alternatively, the features from the ROI can be treated equally as features from the other regions, or otherwise treated. In some variations, the scanning model is trained on historic regions of interest in external scenes corresponding to historic driver gaze directions, historic auxiliary sensor data associated with interior images, and historic external scene features of the external scenes. In some variations, the historic driver gaze directions are each extracted from an interior image. In some variations, the historic external scene features are features that have been extracted from external images contemporaneously sampled with the respective interior images.

In some variations, the external scene information includes external scene measurements. In some variations, the external scene measurements include LIDAR measurements. In some variations, the external scene information includes external camera image data.

The method can include Block S500, which includes providing output to a human driver based on the driving policy. Block S500 functions to apply a driving policy to driver behavior and suggest driver actions to a human driver according to the driving policy.

Block S500 can include coaching a human driver based on the driving policy. For example, Block S500 can include providing an output that coaches the driver to scan the road, to look towards a region of interest (e.g., as output by a driving policy model based on a current vehicle event and/or driving scenario), to check the vehicle mirrors (e.g., side view mirrors, rear view mirrors, etc.), to be alert for pedestrians (e.g., at a crosswalk, at a surface street intersection, etc.). The output can be provided in the form of an audio output (e.g., a voice message, a beep pattern, a coded audio signal, etc.), a visual output (e.g., a rendering of a region of interest on a heads up display, an arrow pointing towards a designated region of interest rendered at a display within the vehicle, a light emitter of the onboard vehicle system, etc.), and any other suitable output type.

In variations, Block S500 can include capturing, at an interior-facing camera, whether a driver is looking at locations of high saliency (e.g., corresponding to a high saliency score, a saliency metric above a threshold, etc.) associated with a given vehicle event. For example, if a driver is intending to make a right turn at an intersection, while the exterior-facing camera captures the other object trajectories in relation to the path of the host vehicle (e.g., vehicle trajectories, pedestrian trajectories, etc.), the interior-facing camera can capture whether the driver was looking in the correct directions (e.g., towards regions of high saliency, towards directions determined based on the driving policy, etc.) to suitably execute the right turn.

Block S500 can be performed in real-time (e.g., near real-time, substantially real-time, etc.) during vehicle operation. For example, Block S500 can include alerting a human driver that the human driver is checking their blind spot at an inadequate frequency, according to the determined driving policy, based on real-time extraction of driver behavior including the human driver's gaze direction (e.g., whether the gaze direction is aligned with a rear-view and/or side-view mirror at a predetermined frequency, in relation to detected vehicle maneuvers, etc.). Additionally or alternatively, Block S500 can be performed subsequent to a driving action performed by a human driver (e.g., after the conclusion of a vehicle event, after the conclusion of a driving session, etc.). For example, Block S500 can include determining a performance score associated with a driving session and/or driver actions during a specific vehicle event (e.g., based on a comparison of driver behavior with the driving policy), and providing the performance score to the human driver subsequent to the driving session and/or vehicle event (e.g., as at least a part of a summary report of driver performance). However, Block S500 can additionally or alternatively be performed with any suitable temporal characteristics (e.g., prior to a driving session as a reminder of past performance, periodically during a driving session, periodically at any suitable frequency, continuously, asynchronously, etc.).

The method of the preferred embodiment and variations thereof can be embodied and/or implemented at least in part as a machine configured to receive a computer-readable medium storing computer-readable instructions. The instructions are preferably executed by computer-executable components preferably integrated with a suitable system and one or more portions of a processor or controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various Blocks of the method, any of which can be utilized in any suitable order, omitted, replicated, or otherwise suitably performed in relation to one another.

As a person skilled in the art will recognize from the previous detailed description and from the figures and claims, modifications and changes can be made to the preferred embodiments of the invention without departing from the scope of this invention defined in the following claims.

What is claimed is:

1. A method, comprising:
    obtaining driving data sets for respective vehicles, each of the driving data sets comprising synchronized interior image data and exterior image data, wherein the synchronized interior image data and exterior image data are associated with vehicle control inputs;
    for each of the driving data sets, determining a driving quality metric that indicates a driving quality;
    selecting one of the driving data sets, having the driving quality metric satisfying a condition; and
    providing the exterior image data from the selected one of the driving data sets for training a driving response model based on the exterior image data from the selected one of the driving data sets.

2. The method of claim 1, further comprising:
    for each of the driving data sets:
        determining driver attention based on the interior image data of the corresponding driving data set; and
        determining a region of interest (ROI) based on driver attention.

3. The method of claim 1, wherein the driving response model is trained based on an exterior scene feature extracted from the exterior image data of the selected one of the driving data sets.

4. The method of claim 1, wherein one of the driving quality metrics is determined based on the interior image data of the corresponding driving data set.

5. The method of claim 1, wherein one of the driving quality metrics comprises an attentiveness score, determined based on driver gaze, wherein the driver gaze is extracted from the interior image data of the corresponding driving data set.

6. The method of claim 5, wherein the attentiveness score is determined based on the driver gaze and a region of interest identified in the exterior image data of the corresponding driving data set.

7. The method of claim 1, wherein one of the driving quality metrics comprises a driver score.

8. The method of claim 1, wherein one of the driving quality metrics is determined based on a comparison of driver behavior, indicated by the corresponding driving data set, with an expected driving behavior.

9. The method of claim 1, wherein one of the driving quality metrics comprises a ride comfort metric.

10. The method of claim 1, wherein at least one of the driving data sets is obtained by:
    detecting a predetermined driving event; and
    recording the synchronized interior image data and exterior image data for the at least one of the driving data sets after detecting the predetermined driving event.

11. The method of claim 1, wherein the synchronized interior image data and exterior image data of the driving data sets are obtained by a remote computing system, and wherein the act of determining the driving quality metrics, the act of selecting the one of the driving data sets, and the act of providing the exterior image data from the selected one of the driving data sets for training the driving response model, are performed by the remote computing system.

12. The method of claim 1, wherein the driving response model is trained for different driving events using different respective ones of the driving data sets.

13. The method of claim 1, further comprising extracting exterior scene feature from the exterior image data of one of the driving data sets by:
  determining a point cloud based on the exterior image data of the one of the driving data sets; and
  extracting the exterior scene feature from the point cloud.

14. The method of claim 1, wherein the act of obtaining driving data sets and the act of determining driving quality metrics for the respective driving data sets are performed by a vehicle onboard system.

15. The method of claim 1, wherein the driving response model is trained based on the exterior image data of the selected one of the driving data sets, and also based on the vehicle control inputs associated with the selected one of the driving data sets.

16. The method of claim 1, wherein the driving response model is trained based on the exterior image data of the selected one of the driving data sets, and also based on driver behavior that is determined based on the interior image data of the selected one of the driving data sets.

17. A system, comprising:
  an interior camera configured to generate interior image data of a vehicle;
  an exterior camera configured to generate exterior image data of the vehicle; and
  a processing system configured to:
    obtain a driving data set for a driving session that includes the interior image data and the exterior image data provided by the interior camera and the exterior camera, respectively, wherein the interior image data and the exterior image data are synchronized with each other and are associated with vehicle control inputs;
    determine a driving quality metric for the driving data set, the driving quality metric indicating a driving quality; and
    providing the driving data set for training a driving response model, wherein the driving response model is based on an external scene feature extracted from the exterior image data and a driver behavior extracted from the interior image data.

18. The system of claim 17, further comprising:
  a scanning model configured to determine a region of interest (ROI) for the exterior image data; and
  a gaze detector configured to extract an eye gaze of a driver from the interior image data;
  wherein the system is configured to use the ROI and the eye gaze to determine the driving quality metric for the driving data set.

19. The system of claim 17, further comprising:
the driving response model,
wherein the system is configured to generate a notification when a driving behavior differs from an expected driving behavior.

20. The system of claim 17, wherein the driving response model is also based on the vehicle control inputs.

* * * * *